(12) United States Patent
Elliott et al.

(10) Patent No.: US 8,558,129 B2
(45) Date of Patent: Oct. 15, 2013

(54) ELECTRICAL SWITCHING COMPONENT

(75) Inventors: Randall B. Elliott, Tigard, OR (US); John B. Engel, Tigard, OR (US); Rhonda L. Wilson, Monmouth, OR (US); Pieter Agnar Paulson, Portland, OR (US)

(73) Assignee: Leviton Manufacturing Co., Inc., Melville, NY (US)

( * ) Notice: Subject to any disclaimer, the term of this patent is extended or adjusted under 35 U.S.C. 154(b) by 26 days.

(21) Appl. No.: 13/470,194

(22) Filed: May 11, 2012

(65) Prior Publication Data
US 2012/0281340 A1 Nov. 8, 2012

Related U.S. Application Data

(62) Division of application No. 12/562,732, filed on Sep. 18, 2009, now Pat. No. 8,330,062.

(51) Int. Cl.
*H01H 1/64* (2006.01)
*H01H 1/66* (2006.01)
*H01H 9/02* (2006.01)

(52) U.S. Cl.
USPC .......................................... 200/293; 200/296

(58) Field of Classification Search
USPC ........... 200/50.17, 50.21–50.27, 51 R–51.12, 200/293, 297, 303–307; 361/600–617, 361/641–658, 679.4–679.51, 726–747, 361/826–837; 174/17 R, 17 VA, 495–499, 174/50, 50.54, 520–526, 559, 95–97, 140 R, 174/144–187; 439/76.1, 115, 116, 119, 439/121, 122, 188, 189, 207, 210, 211, 212, 439/296, 527, 536, 562, 565, 571, 594, 439/620.21
See application file for complete search history.

(56) References Cited

U.S. PATENT DOCUMENTS

| 3,328,553 | A |   | 6/1967 | Gryctko |
| 3,599,167 | A | * | 8/1971 | Adrian et al. ................. 439/186 |
| 3,633,075 | A |   | 1/1972 | Hawkins |
| 3,786,208 | A | * | 1/1974 | Edwards ..................... 200/51 R |

(Continued)

FOREIGN PATENT DOCUMENTS

| EP | 0039869 A1 | 4/1981 |
| JP | 06-096656 A | 4/1994 |

(Continued)

OTHER PUBLICATIONS

International Search Report and Written Opinion for PCT Application No. PCT/US2009/061367, dated May 24, 2010, 11 pages.

(Continued)

*Primary Examiner* — Renee Luebke
*Assistant Examiner* — Lheiren Mae Caroc
(74) *Attorney, Agent, or Firm* — Marger Johnson & McCollom PC

(57) ABSTRACT

An apparatus including an electrical switching device to control current to a load and a second case arranged to substantially encapsulate the electrical switching device. The electrical switching device includes a first case; a plurality of contacts disposed in the first case; and an opening in the first case disposed to expose the contacts. The second case is arranged to duct a blast from the opening of the first case of the electrical switching device.

28 Claims, 17 Drawing Sheets

(56) References Cited

U.S. PATENT DOCUMENTS

| | | | |
|---|---|---|---|
| 4,096,884 A | 6/1978 | Horowitz | |
| 4,181,836 A | 1/1980 | Miracle | |
| 4,427,863 A | 1/1984 | Fujita | |
| 4,485,283 A | 11/1984 | Hurtle | |
| 4,675,987 A | 6/1987 | Minks et al. | |
| 4,835,502 A | 5/1989 | Minnette | |
| 4,885,438 A * | 12/1989 | Tajima | 200/51.09 |
| 5,192,227 A | 3/1993 | Bales | |
| 5,258,889 A | 11/1993 | Belanger, Jr. | |
| 5,276,443 A * | 1/1994 | Gates et al. | 710/2 |
| 5,338,908 A | 8/1994 | Rahman et al. | |
| 5,360,129 A | 11/1994 | Lee | |
| 5,574,624 A | 11/1996 | Rennie et al. | |
| 5,645,455 A * | 7/1997 | Seki | 439/723 |
| 5,773,755 A | 6/1998 | Iwatare | |
| 5,933,319 A | 8/1999 | Buckner et al. | |
| 6,002,313 A | 12/1999 | Mrenna et al. | |
| 6,037,555 A | 3/2000 | Castonguay et al. | |
| 6,088,219 A | 7/2000 | Yanniello et al. | |
| 6,188,036 B1 | 2/2001 | Arnold | |
| 6,198,063 B1 | 3/2001 | Kramer | |
| 6,222,147 B1 | 4/2001 | Doughty et al. | |
| 6,232,855 B1 | 5/2001 | Malingowski et al. | |
| 6,262,880 B1 | 7/2001 | Fischer et al. | |
| 6,295,930 B1 | 10/2001 | Kume et al. | |
| 6,366,448 B1 | 4/2002 | Berndt | |
| 6,426,688 B1 | 7/2002 | DeVizzi et al. | |
| 6,515,850 B2 * | 2/2003 | Fournier et al. | 361/627 |
| 6,614,339 B2 | 9/2003 | Parry et al. | |
| 6,670,729 B2 | 12/2003 | Novinsky et al. | |
| 6,762,389 B1 | 7/2004 | Crooks et al. | |
| 6,838,962 B2 | 1/2005 | Leone et al. | |
| 6,897,760 B2 | 5/2005 | Kawata et al. | |
| 6,924,721 B2 | 8/2005 | Afshari et al. | |
| 7,009,132 B1 | 3/2006 | Shea et al. | |
| 7,034,241 B2 | 4/2006 | Fleege et al. | |
| 7,034,242 B1 | 4/2006 | Shea et al. | |
| 7,236,352 B2 | 6/2007 | Dalis | |
| 7,286,340 B2 | 10/2007 | Karim et al. | |
| 7,324,332 B1 | 1/2008 | Shelton | |
| 7,342,325 B2 | 3/2008 | Rhodes | |
| 7,405,923 B2 | 7/2008 | Kelly et al. | |
| 7,460,360 B2 | 12/2008 | Schomaker et al. | |
| 7,468,883 B2 | 12/2008 | Mann | |
| 7,477,525 B2 * | 1/2009 | Coutancier et al. | 361/801 |
| 7,488,915 B2 | 2/2009 | Pollitt et al. | |
| 7,515,427 B2 * | 4/2009 | King et al. | 361/725 |
| 7,538,645 B2 | 5/2009 | Nishi et al. | |
| 7,558,052 B1 | 7/2009 | Coomer et al. | |
| 7,781,689 B2 | 8/2010 | Jur et al. | |
| 7,821,774 B2 | 10/2010 | Josten et al. | |
| 7,843,682 B2 | 11/2010 | Leinen et al. | |
| 8,101,881 B2 | 1/2012 | Miller et al. | |
| 2007/0115616 A1 * | 5/2007 | Vackar | 361/601 |
| 2007/0158171 A1 * | 7/2007 | Deboer et al. | 200/331 |
| 2009/0179010 A1 | 7/2009 | Asokan et al. | |
| 2009/0185336 A1 | 7/2009 | Karim et al. | |
| 2011/0067988 A1 * | 3/2011 | Elliott et al. | 200/306 |
| 2011/0090667 A1 | 4/2011 | Wilson et al. | |

FOREIGN PATENT DOCUMENTS

| | | |
|---|---|---|
| JP | 08-138514 A | 5/1996 |
| KR | 20-1998-0042913 U | 9/1998 |
| KR | 10-2006-009487 A | 8/2006 |
| KR | 10-0693704 B1 | 3/2007 |

OTHER PUBLICATIONS

International Preliminary Report on Patentability for PCT Application No. PCT/'US 2009/061367, dated Apr. 26, 2011, 5 pages.

* cited by examiner

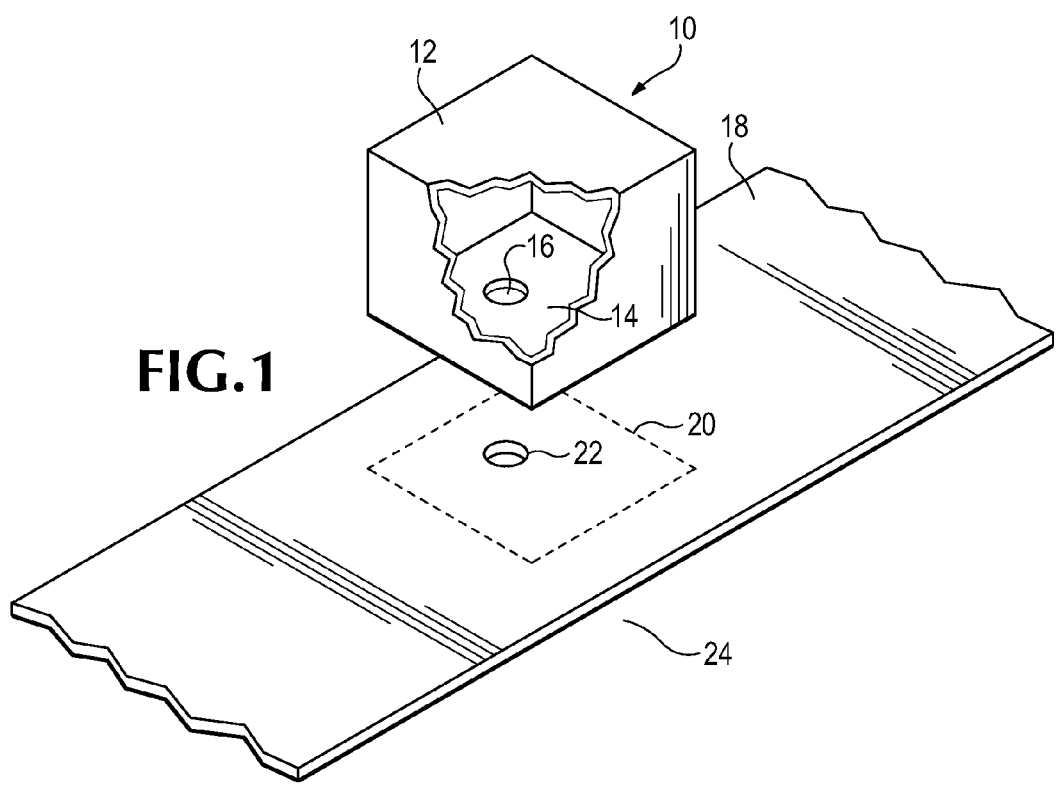

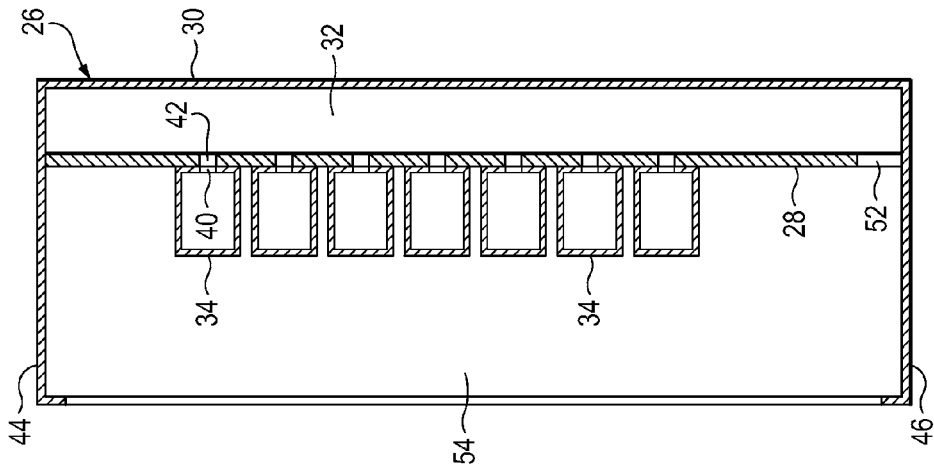
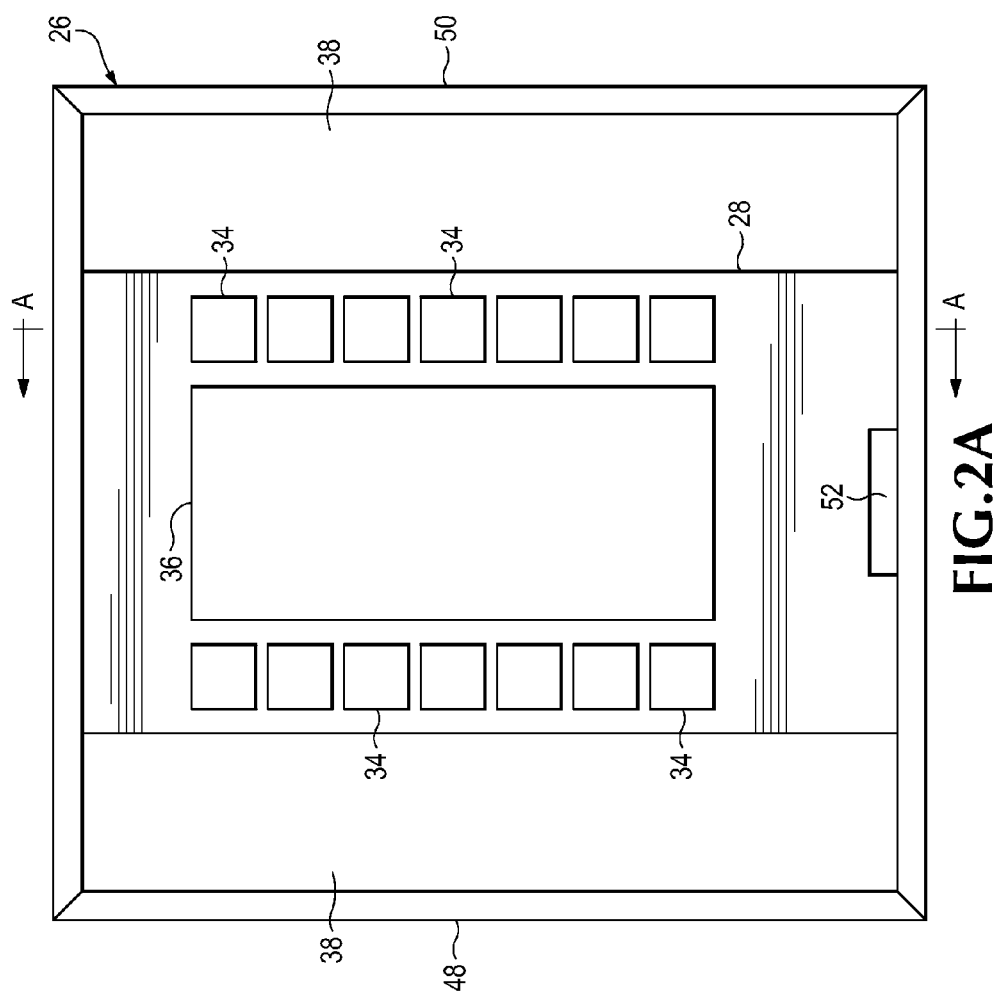
FIG.2B
FIG.2A

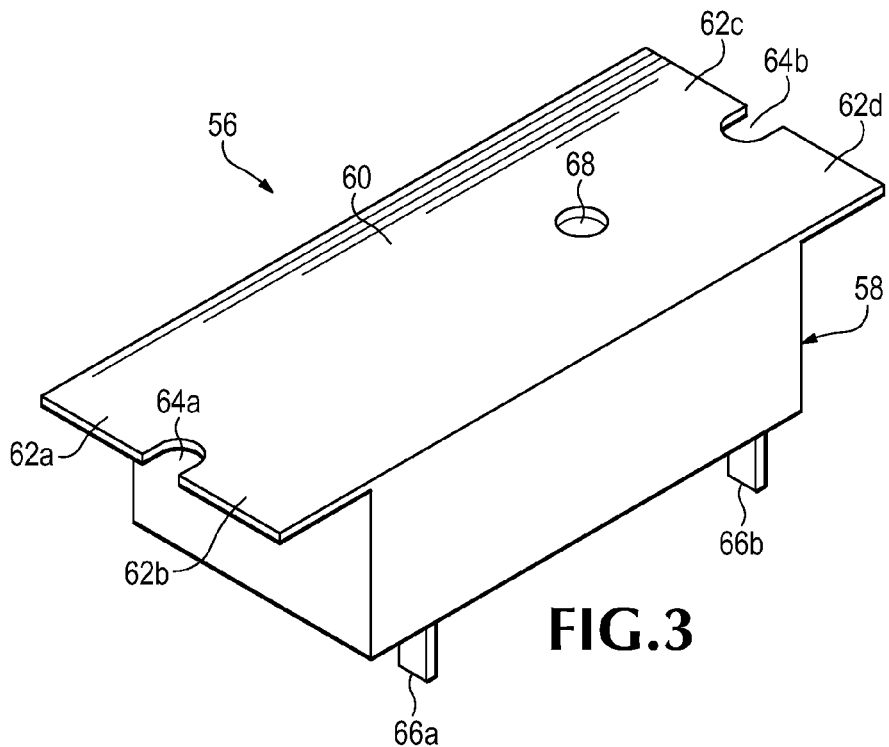
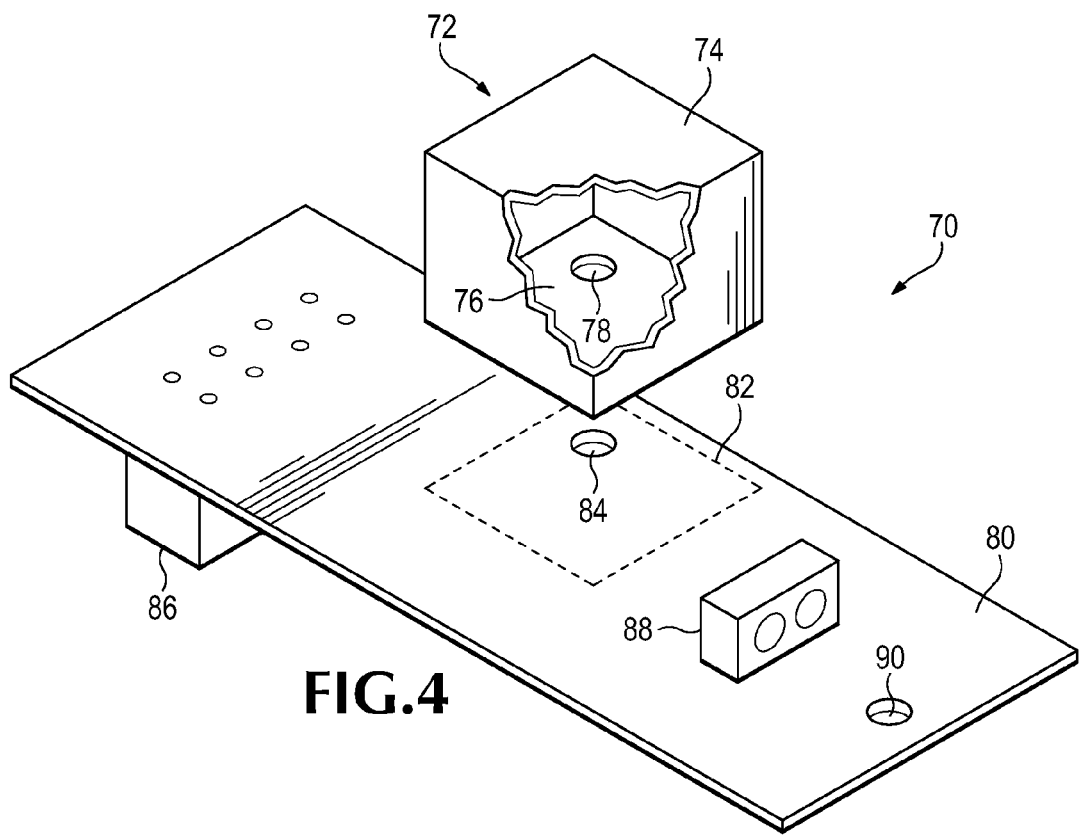

US 8,558,129 B2

ELECTRICAL SWITCHING COMPONENT

CROSS-REFERENCE TO RELATED APPLICATION

This application claims priority from, and is a divisional of, U.S. patent application Ser. No. 12/562,732 filed Sep. 18, 2009.

BACKGROUND

Electrical switching devices such as relays and circuit breakers are often encapsulated in cases to protect the operating mechanisms from dust, moisture and other environmental conditions, and to prevent technicians and others from contacting live electrical parts. Certain operating conditions may cause a blast or build-up of hot, pressurized gases and other materials within the case. For example, short circuits may cause contacts in relays or circuit breakers to melt or explode, thereby releasing hot gases and molten metal. As another example, an over current condition may cause the contacts in a circuit breaker to open, which may in turn, create a momentary arc between the contacts. The arc releases a blast of ionized air.

If the blast is not vented from inside the case, it may damage, destroy or interfere with the operation of the electrical device and/or cause the case to rupture, thereby scattering dangerous blast products which can, in turn, cause a fire and/or create an electrical shock hazard. Thus, cases for electrical switching devices are often provided with a vent in the top or side of the case to enable a short circuit or other type of blast to escape from within the case. While venting the case may solve certain problems with the electrical switching device, it often causes other problems. For example, in an electrical enclosure housing multiple components, a blast from one device may be directed at another device, which in turn is damaged or destroyed by the blast. In addition, within the electrical switching device, the blast can short high voltage terminals with low voltage circuitry, creating a potential hazard.

Some other previous efforts to accommodate a blast from an electrical switching device have involved the use of complicated systems of baffles or dividers between components to direct the blast from one component away from other components. These systems, however, add cost and complexity, and may still create hazardous conditions.

BRIEF DESCRIPTION OF THE DRAWINGS

FIG. 1 illustrates an embodiment of a venting system for an electrical switching component according to the inventive principles of this patent disclosure.

FIG. 2A is a front view of another embodiment of a venting system according to the inventive principles of this patent disclosure.

FIG. 2B is a cross section taken through line AA of the embodiment of FIG. 2A.

FIG. 3 illustrates an embodiment of a relay according to some inventive principles of this patent disclosure.

FIG. 4 illustrates an embodiment of a relay card according to some inventive principles of this patent disclosure.

DETAILED DESCRIPTION

Figure 5:
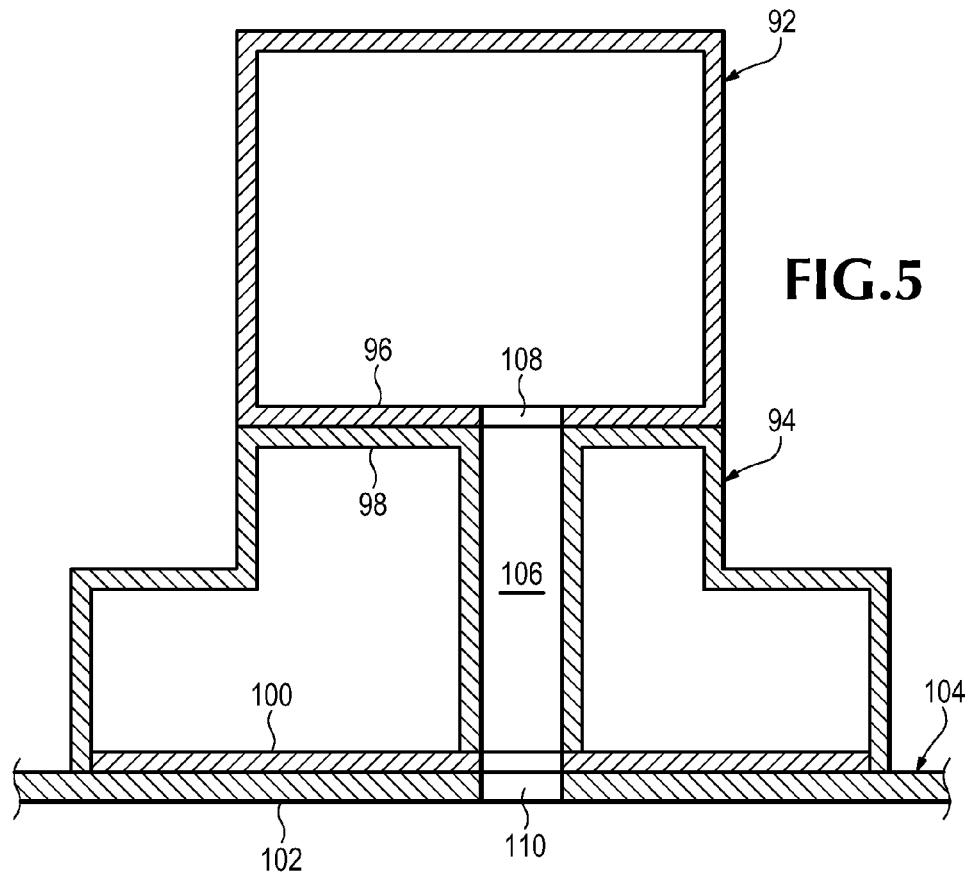
FIG. 5 is a cross-sectional view illustrating another embodiment of a venting system according to some inventive principles of this patent disclosure.

FIG. 1 illustrates an embodiment of a venting system for an electrical switching component according to the inventive principles of this patent disclosure. The embodiment of FIG. 1 includes an electrical switching component 10 having an electrical switching device (not shown) substantially encapsulated in a case 12. The case has a mounting portion 14, which in this example is the bottom of the case 12. The mounting portion includes a vent 16 to enable gases and other material from a blast to escape from within the case. The embodiment of FIG. 1 also includes a chassis 18 having a mounting site 20 where the electrical switching device 10 is mounted to the chassis. The mounting site 20 includes a passage 22 to enable the blast from vent 16 to flow from the case through the chassis and into a blast diverting space 24.

FIG. 1 shows the electrical switching component 10 elevated above the chassis 18 so as not to obscure the details of the mounting site 20. When fully assembled, however, the electrical mounting portion 14 of switching component 10 is mounted to the mounting site 20 of the chassis 18 so the vent 16 is generally aligned with the passage 22.

The electrical switching device contained in the case is not shown in FIG. 1 so as not to obscure the mounting portion 14 or vent 16. The electrical switching device may be a relay, a circuit breaker, a manually actuated switch, a dimmer, or any other type of device or combination of devices that controls current to a load and which, in response to electrical stress such as a short circuit, over current condition, etc., or during normal operation, may produce a blast of gases, molten metal or any other matter that may damage or interfere with the operation of the device if not vented out of the case. A blast need not necessarily be a high pressure event, but may be, for example, a puff of ionized air generated by an arc caused by opening a switch on an inductive load.

The case 12 may be of any suitable size, shape, material, etc., for enclosing the specific type of electrical switching device. Some examples of suitable materials include various plastics, composites, glasses, metals, etc. commonly used for encapsulating relays, circuit breakers, switches, etc. The case 12 need not completely encapsulate the electrical switching device. For example, the case may include loose-fitting openings around electrical terminals that pass through the case, or there may be small gaps where different portions of the case are joined, or there may be imperfectly fit openings for access to potentiometers, dip switches and the like. Relatively small amounts of gas or other matter may escape from these openings without defeating the purpose of the vent 16.

The vent 16 may have any suitable form to vent gases or other material from the case. Some examples include a simple circular hole, a combination of holes to form a baffle, a pressure relief valve set to open only when the inside of the case reaches a certain internal pressure and/or temperature, a relatively thin or weak portion of the case that ruptures under pressure or high heat, an elastomeric material that opens to vent, but then recloses after venting, etc.

The mounting portion 14 in the embodiment of FIG. 1 is shown as a flat bottom portion of the case 12 to enable the case to be attached to the flat mounting site 20 on chassis 18, but countless variations are contemplated by the inventive principles of this patent disclosure. For example, in some embodiments, the mounting portion may be molded with a profile to fit in or on a rail or track such as a standard DIN rail. In other embodiments, the mounting portion may be shaped to plug into a relay socket. In an embodiment for a snap-in type circuit breaker, the mounting portion may include the flat bottom of the circuit breaker case which is bounded at one end by a hook to engage the panel and at the other end by the plug-in terminal to engage the power distribution bus.

The manner in which the electrical switching component 10 is attached to the chassis 18 is not limited to any particular technique and may depend on the configuration of the chassis 18 and/or the mounting portion 14 of the case 12. In an embodiment having two flat mating surfaces as shown in FIG. 1, any type of fasteners such as screws, rivets, clips, adhesive etc. may be used. Either or both surfaces may have interlocking tabs, slots, recesses, protrusions, etc. In embodiments that utilize plug-in sockets, the case may be held to the chassis by the force of mating contacts and or tabs in the case. These forces may be supplemented or replaced by hold-down clips or other fasteners. As another example, in embodiments that utilize mounting rails or tracks, the mounting portion 14 of the case 12 may simply slide into or on the track or rail.

The chassis 18 and mounting site are not limited to any particular configurations, although some specific examples are described below. In the embodiment of FIG. 1, the chassis 18 is shown as a flat mounting plate that can be fabricated from metal or any other suitable material, and the mounting site 20 is simply a portion of the plate matching the footprint of the case 12. In some other embodiments, the chassis may be in the form of a rail or a track in which any portion of the rail or track may be designated as a mounting site. In other embodiments, the chassis may be a socket having a mounting site that includes receptacles for electrical terminals and/or tabs on the mounting portion of the case. In yet other embodiments, a printed circuit board may serve as the chassis with a mounting site that includes drilled holes, plated holes, etc. to receive the electrical switching component in the form of a board mount relay, circuit breaker, etc. The chassis may be a free-standing chassis, or it may be mounted in, or integral with, an enclosure.

The passage 22 is shown as a simple circular hole in the embodiment of FIG. 1, but the inventive principles contemplate many different forms. The passage may include multiple holes, channels, tubes, valves, etc. to direct the blast from the vent 16 to the blast diverting space 24. As with the vent 12, the passage 22 may be implemented as a relatively weak or thin portion of the chassis that ruptures under pressure or heat.

The blast diverting space 24 may be any suitable open or enclosed space. For example, it may be specifically designed to receive the blast, or it may utilize an existing space in the chassis or an enclosure in which the chassis is mounted. The blast diverting space may be empty, or it may be fully or partially filled with material to absorb, diffuse, cool, redirect, or otherwise process the blast.

FIGS. 2A and 2B (which may be referred to collectively as FIG. 2) illustrate another embodiment of a venting system according to the inventive principles of this patent disclosure. The embodiment of FIG. 2 is directed to a relay control panel that is housed in a sheet metal enclosure 26. The electrical components are attached to a mounting plate 28 which, as best seen in FIG. 2B, is spaced apart from the back wall 30 of the enclosure 26 to form a space 32 which is utilized as a blast chamber as described below. The mounting plate 28 may be positioned relative to the back wall using spacers, folded sheet metal, or any other suitable technique.

Referring to FIG. 2A, the relay control panel may include any number of relays 34 which, in this example, are arranged in two rows on either side of low-voltage control circuitry 36. The low-voltage control circuitry may include a printed circuit board having one or more microprocessors, communication interfaces, timing circuits, interface circuitry for photo sensors, occupancy sensors and the like, as well as circuitry to drive the coils of relays 34. High voltage wiring areas 38 on either side of the enclosure 26 provide space for the connection of line and load wires to the relay contact terminals. Though not shown, the enclosure may include a front panel to fully enclose the panel.

In the example embodiment of FIG. 2, the relays may have molded plastic cases with mounting portions implemented as flat bottom flanges that mount directly to designated sites on the mounting plate 28 using any suitable attachment technique. High-voltage connections may be made to the relay contacts through spade-lug connectors or screw terminals on the tops of the relays, while low voltage connections may be made to the relay coils through similar terminals on the tops of the relays.

In other embodiments, the relays may be attached in the form of relay cards having one or more relays mounted on a printed circuit board along with terminal blocks and other support circuitry. Each relay card may have a terminal header to couple the card to corresponding terminals of the low voltage control circuitry 36. The relay card may also be attached to the mounting panel with spacers, stand-offs, a sheet of insulated material, etc.

In the embodiment shown in FIG. 2B, each relay has a vent hole 40 in the bottom of its case that aligns with a corresponding hole 42 in the mounting plate 28. In an embodiment having relay cards, each printed circuit board may have a corresponding hole that aligns with both of the holes 40 and 42. Depending on the manner in which the printed circuit board is attached to the mounting plate, i.e., if the card is spaced apart from the plate, a tube or other apparatus may be included to direct the blast from the holes in the relay and printed circuit board to the hole in the mounting plate 28.

As best seen in FIG. 2B, any blast from one of the relays 34 is directed into a blast chamber 32 formed between the mounting plate 28 and the back wall 30 of the enclosure, as well as a portion of the top wall 44 and bottom wall 46 and the side walls 48 and 50 of the enclosure. A vent 52 is located at the lower end of the mounting plate 28 and opens the blast chamber into the main volume 54 of the enclosure. Upon release from the vent hole 40, gases and/or other matter in a blast from relay 34 is dispersed throughout the blast chamber 32 and may eventually travel downward to vent 52. If and when the blast makes its way through vent 52 and into the main volume 54 of the enclosure 28, it may have dissipated enough to prevent damage or interfere with the operation of other components located within the enclosure. For example, hot exhaust gases may have cooled, ionized air may have become de-ionized, and molten metal may have solidified, clung to the back wall of the enclosure, or fallen to the bottom of the blast chamber.

The blast chamber 32 may be empty, or it may be fully or partially filled with a material such as loose flame-resistant fiberglass insulation batting to further contain the blast.

The embodiment of FIG. 2 may provide several benefits depending on the implementation. For example, the system may require few, if any additional components. Electrical enclosures typically include mounting plates that are attached to the back wall of the enclosure with spacers or standoffs. A mounting plate is typically fabricated by a stamping operation in which the plate is cut to size and any necessary holes punched in one stamping operation. The additional holes for the vents may be fabricated in the same stamping operation. Likewise, the vent holes for the relays may be formed in the same molding operation used to create the relay case. Other than providing electrical isolation between components on the mounting plate and the back wall of the enclosure, the space between the plate and the enclosure may essentially be wasted space. Thus, at low additional cost, and perhaps even no additional cost, the embodiment of FIG. 2 may provide effective blast containment by modifying existing components and utilizing previously wasted portions of an electrical enclosure to solve a problem that has troubled panel designers for years.

FIG. 3 illustrates an embodiment of a relay 56 according to some inventive principles of this patent disclosure. In the embodiment of FIG. 3, a relay circuit (not shown) is encapsulated in a molded plastic case 58 having a flat mounting portion 60. The flat mounting portion includes tabs 62*a*-62*d* which form an enlarged flange at the bottom of the relay for attachment to a generally flat mounting site on a chassis. Slots 64*a*, 64*b* are formed between the tabs on either side of the flange to accommodate screws or other fasteners to attach the relay to the chassis. Electrical connections are made to the relay through terminals 66*a*, 66*b* which protrude through the top of the case 58. A vent hole 68 enables gases or other material to escape from within the case 58. The vent hole 68 may be sized and located to align with a corresponding passage in the mounting site of the chassis. Although not limited to any particular application, the embodiment of FIG. 3 may be suited for use in the embodiment of the relay panel of FIG. 2.

FIG. 4 illustrates an embodiment of a relay card according to some inventive principles of this patent disclosure. The relay card 70 of FIG. 4 includes a relay 72 having a case 74 with a mounting portion 76, which in this example is the bottom of the case 74. The mounting portion includes a vent 78 to enable gases and other material from a blast to escape from within the case. The relay 72 is attached to PC board 80 at a mounting site 82 which includes an additional passage or vent 84 to enable the blast to pass through the printed circuit board. A terminal header 86 on the bottom of the PC board engages terminal pins on a control PC board to couple the relay coil and other circuitry on the relay board to low-voltage control circuitry on a control PC board, or to other control circuitry. A terminal block 88 enables high-voltage wiring to be connected to the contacts of the relay 72 through traces on the PC board. Connections to the relay are through terminals (not visible in this view) on the bottom of the case 74 which may be soldered to contacts, plated holes, etc., on the PC board.

The relay card 70 of FIG. 4 maybe mechanically supported at one end by the terminal header 86 and at the other end by a standoff attached to a mounting hole 90. If the terminal card of FIG. 4 is used in a system such as the relay panel shown in FIG. 2, the blast from vents 78 and 84 may be further directed through a corresponding hole 42 in the mounting plate 28. A tube or other blast directing device may be included between the PC board and the mounting plate to form a continuous passage between vents 78 and 84 and hole 42 in the mounting plate 28.

FIG. 5 illustrates another embodiment of a venting system according to some inventive principles of this patent disclosure. The embodiment of FIG. 5 includes a relay 92 similar to the relay 72 of FIG. 4. Rather than being mounted to a PC board, however, the relay 92 is mounted in a plug-in relay socket 94. Though not shown in FIG. 5, electrical and mechanical connections are made through terminal pins or spades that protrude from the bottom mounting portion 96 of the relay 92 and extend through openings in a mounting site 98 of the socket to engage receptacles in the socket. The socket 94 also includes a bottom mounting portion 100 that mounts to a mounting site 102 on a plate 104 or other additional chassis.

In the embodiment of FIG. 5, the socket 94 is formed with a through-passage 106 to connect vent 108 in the bottom of the relay 92 with a passage 110 in the plate 104. This provides a continuous passage to channel a blast from the relay through the socket and plate and into a blast chamber 112. In an alternative embodiment, the socket itself may include a blast chamber, in which case, the bottom of the socket may be closed, or have a reduced aperture to enable only a portion of the blast to pass through the socket and plate.

Figure 6:
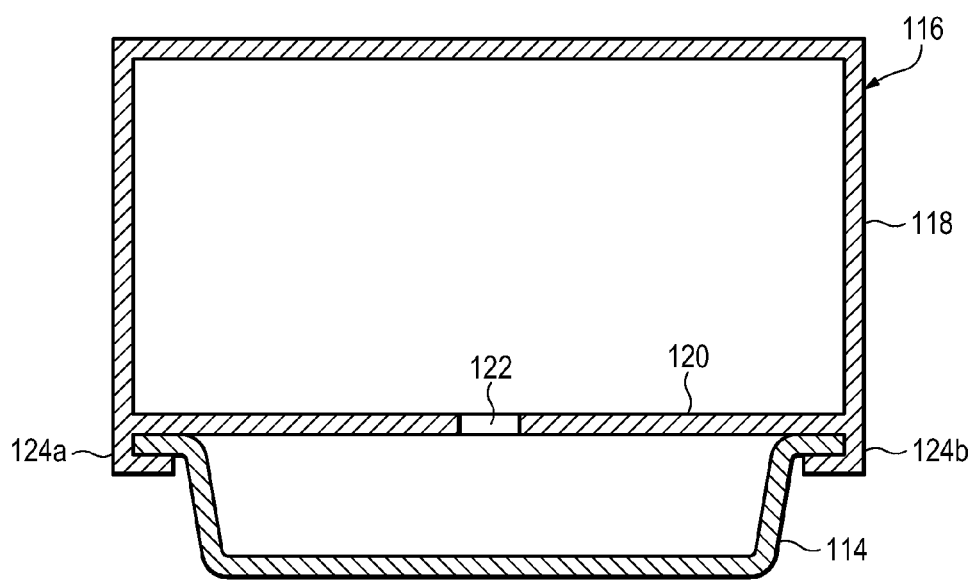
FIG. 6 is a cross-sectional view illustrating another embodiment of a venting system according to some inventive principles of this patent disclosure.

FIG. 6 illustrates another embodiment of a venting system according to some inventive principles of this patent disclosure. The embodiment of FIG. 6 includes a mounting track or rail 114 such as a standard DIN mounting rail. An electrical switching component 116 includes a case 118 having a mounting portion 120 with a vent 122. The case is secured to the rail 114 by rail-engaging members 124a, 124b. The mounting site is simply the portion of the rail on which the case is mounted. In this embodiment, the rail may serve as a blast chamber, either alone, or by directing the blast to one or more additional blast diverting spaces. Thus, the interior cavity of the rail may be filled with blast-absorbing material.

Figure 7:
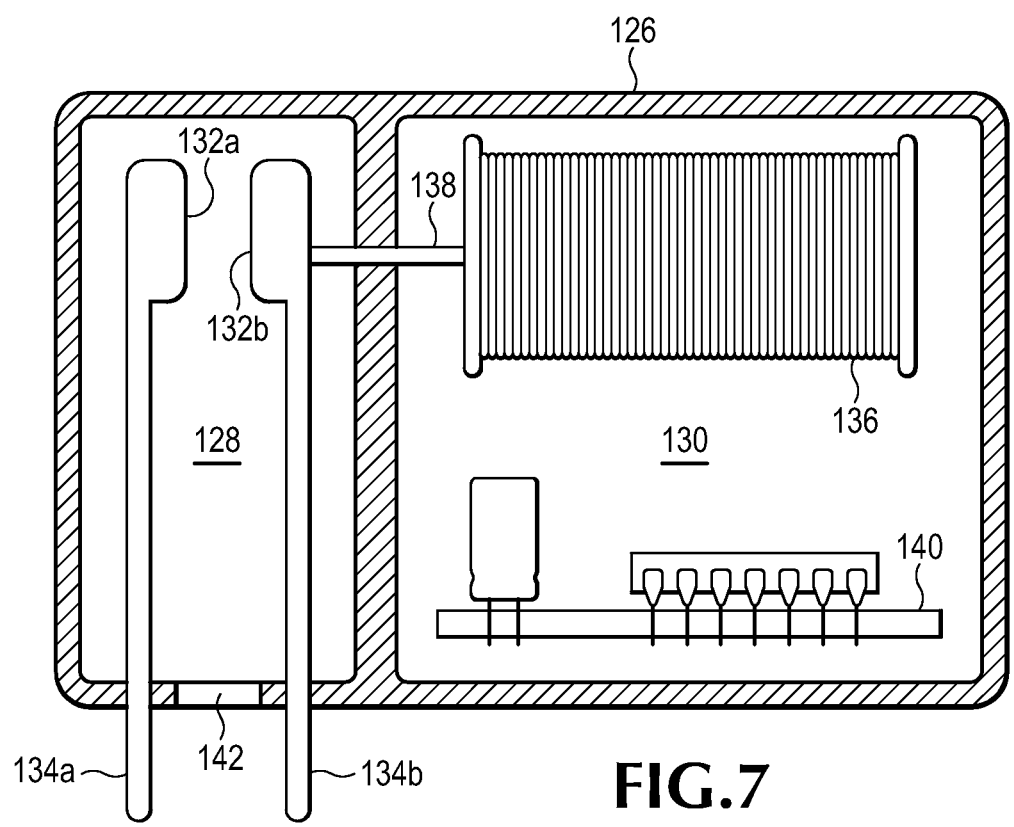
FIG. 7 is a cross-sectional view illustrating another embodiment of an electrical switching component according to some inventive principles of this patent disclosure.

FIG. 7 is a cross-sectional view illustrating another embodiment of an electrical switching component according to some inventive principles of this patent disclosure. In the embodiment of FIG. 7, a relay is housed in a case 126 having at least two chambers. A first chamber 128 contains a pair of contacts 132a,132b, or other switching element, electrically connected to terminals 134a,134b that extend through the case 126. A vent 142 enables a blast from the contacts, for example from an overload or short circuit condition, to escape from the first chamber. The first chamber may include other openings, provided a substantial portion of a blast is directed through vent 142. In some embodiments, the portion of the case having the vent 142 may be a mounting portion, which may also include the terminals 134a, 134b.

A second chamber 130 includes a solenoid 136 or other actuating device to actuate the contacts using a plunger 138 that passes through a chamber wall that separates the first and second chambers. The second chamber 130 also includes electronics 140 to control the operation of the relay and communicate with external components such as a controller.

Placing the contacts 132a, 132b in a separate chamber may protect the components in the second chamber from a blast from the contacts. The second chamber need not be totally enclosed, but may simply be separated enough from the first chamber to substantially protect components in the second chamber from a blast in the first chamber.

Countless variations of this embodiment are possible according to some of the inventive principles of this patent disclosure. In the example of FIG. 7, there are two chambers, but other configurations having different numbers of chambers are contemplated. Some variations may include locating the relay coil in the first chamber or a third chamber. In other embodiments, additional sets of contacts may be located in the first chamber, or the additional contacts may be located in a third chamber, fourth chamber, etc., to prevent a blast from one set of contacts from interfering with the operation of the other contacts. The additional chambers may have additional vents which may be located in the same mounting portion as the first vent, in a different mounting portion of the case, or in a non-mounting portion of the case.

Figure 8:
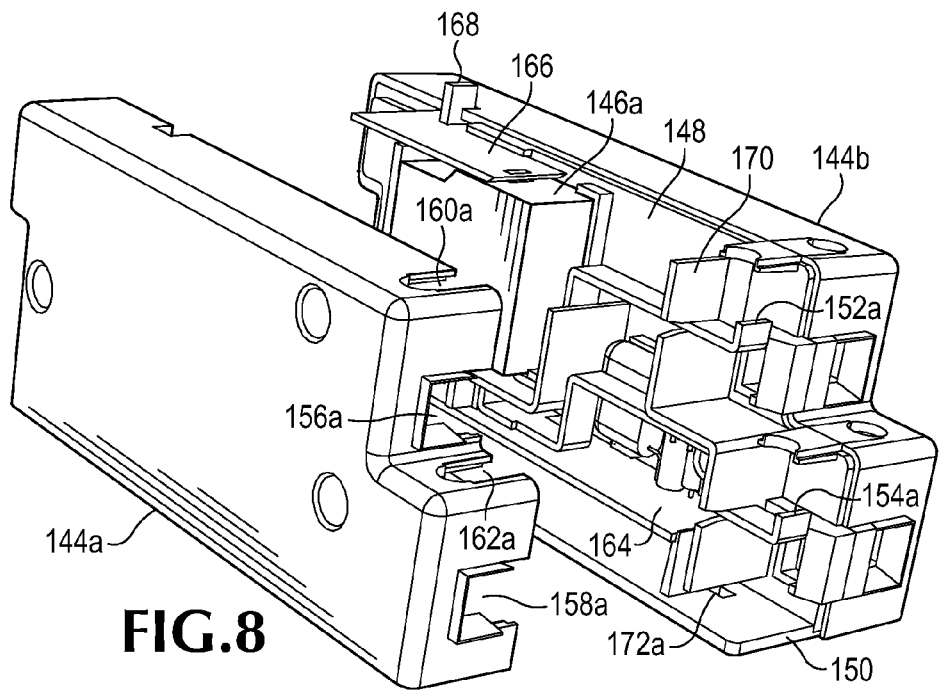
FIG. 8 is a partially exploded perspective view illustrating another embodiment of a venting system according to some inventive principles of this patent disclosure.

FIG. 8 is a partially exploded perspective view illustrating an embodiment of a relay assembly having a venting system according to some inventive principles of this patent disclosure. The embodiment of FIG. 8 illustrates a two-pole assembly, meaning that two different relays for switching two different circuits are included in one case. The case includes two side shells 144a and 144b, each of which houses one of the relays. In this view, only the left-side relay 146a is visible. A bulkhead 148 divides the entire case in half so that a blast on one side does not interfere with the operation of the circuitry on the other side. The case also includes a base plate 150 to mount the relay assembly to a mounting site on a plate, channel, or other suitable apparatus.

Connections to the contacts of the left-side relay 146a are through conductors 152a and 154a. External wires may be connected to the conductors by screw terminals (not shown) attached to the conductors. Apertures 156a and 158a allow the wires to be inserted into the terminals, while apertures 160a and 162a provide screwdriver access to the terminals. Connections to the relay solenoid and/or control electronics may be made through header pins, terminal blocks, wire leads or any other suitable arrangement. In the example of FIG. 8, the relay 146a is mounted to a printed circuit board 164 which includes header pins (not visible in this view) to provide connections through the case to the relay solenoid and/or control electronics on the circuit board. A slider plate 166 moves manual override actuators simultaneously on both relays in response to motion of a manual actuator 168 which protrudes through an opening in the case.

In the event of a blast from relay 146a, another bulkhead 170 prevents the blast from exiting the terminal apertures 156a-162a (which may damage the external wires) and instead directs the blast through a vent 172a in the base plate 150. Another vent 172b (not visible in this view) is arranged in a similar location on the other side of the base plate to vent a blast from the relay 146b on the other side of the case.

Relay 146a may be an open frame device, or it may be contained within another (inner) case as shown here. The inner case may have a single chamber, or it may have multiple chambers as described above in the context of FIG. 7. The inner case may be designed to rupture in the event of a blast, in which case the gases and/or other material from the blast flow through the open spaces within the outer case 144a, 144b, 150 until they are directed to the vent 172a. In some embodiments, additional bulkheads, passages, baffles, etc. may be arranged within the outer case to channel the blast to the vent. Alternatively, the inner case may be designed to expel a blast in a more controlled manner. For example, the inner case may include a vent in a mounting portion, or any other portion, which may be oriented to direct a blast in the general direction of the vent 172a, either directly through any open space in the outer case, or through a system of additional bulkheads, passages, baffles, etc.

Figure 9:
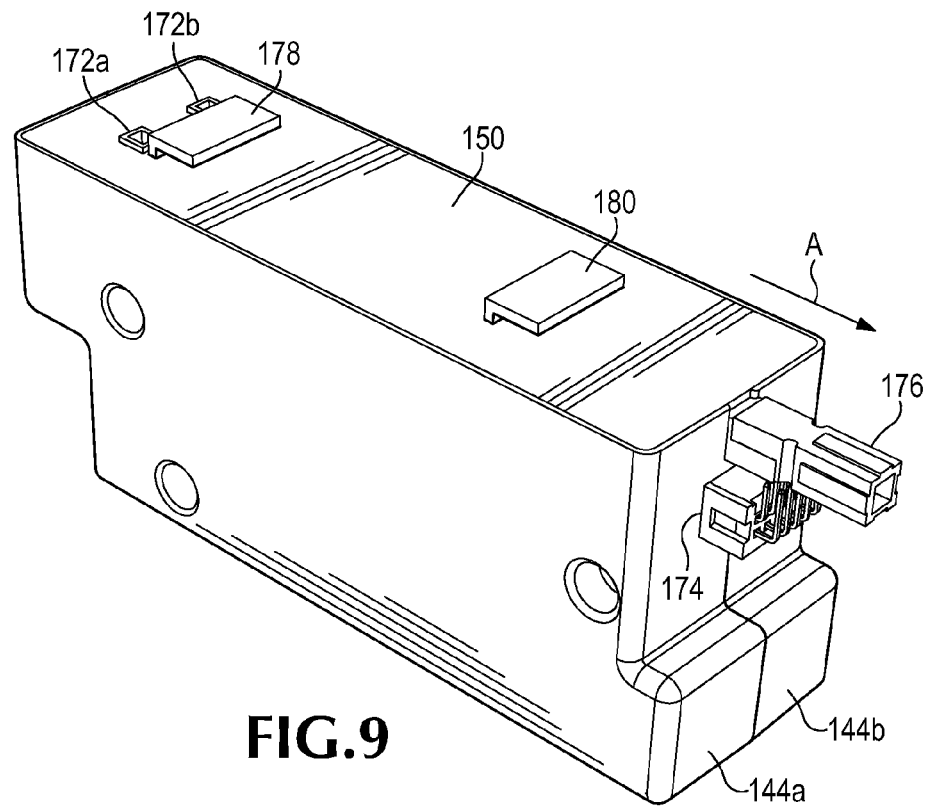
FIG. 9 is a perspective view showing the opposite side of the embodiment of FIG. 8.

FIG. 9 is a perspective view showing the opposite side of the embodiment of FIG. 8. In the view of FIG. 9, both of vents 172a and 172b are visible in the base plate 150, and both case shells 144a and 144b are shown in their assembled positions. A right angle header 174 is shown in the position it is in when the header pins for the solenoid/control connections are fully engaged with the header. The right angle terminals extending from the header 174 may be soldered to a circuit board (not shown) on which control circuitry is located. For example, control circuitry 36 shown in FIG. 2A may be interfaced to the embodiment of FIG. 9 through header 174. Another connector 176 may be included to provide additional or alternative mechanical and/or electrical connections to the relay assembly.

In the embodiment of FIG. 9, the base plate 150 includes mounting ears 178 and 180 which may pass through apertures in a mounting plate and engage the plate to secure the relay assembly to a mounting site on the plate when the relay assembly is slid in the direction of arrow A. This sliding action may also cause the terminal pins to engage in header 174, and may additionally cause connector 176 to engage the case of the relay assembly. The vents 172a and 172b are located relative to mounting ear 178 such that, after the mounting ear passes through an aperture on the mounting plate and the relay assembly is slid into position in the direction of arrow A, the aperture is then positioned over the vents to enable the vents to communicate with the space on the other side of the mounting plate. Thus, the one aperture in the mounting plate operates synergistically as both a passage to vent a blast, and an aperture to engage the mounting ear 178.

Although the example embodiment of FIGS. 8 and 9 is shown as a two-pole relay assembly, other embodiments may be realized with relays, circuit breakers, or other switching devices, and with any number of poles, e.g., single pole, three-pole, etc. Moreover, any number of switch states or positions may be used, for example, single throw, double throw, etc.

Figure 10:
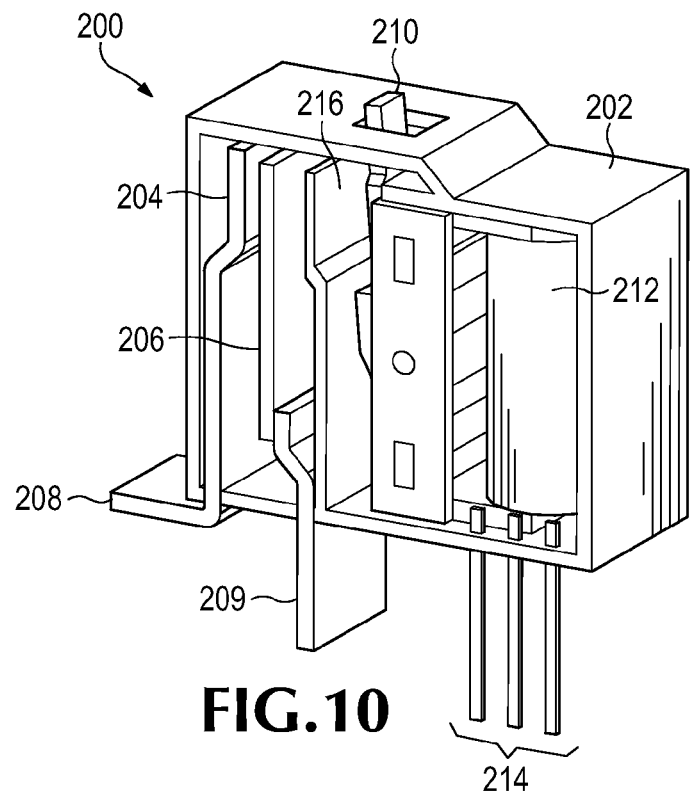
FIG. 10 is a perspective view illustrating an electrical switching device according to some inventive principles of this patent disclosure.

FIG. 10 is a perspective view illustrating an electrical switching device according to some inventive principles of this patent disclosure. In this embodiment, the electrical switching device 200 includes a case 202, contacts 204 and 206, a manual actuator 210, and a solenoid 212. A wall 216 within the electrical switching device substantially separates the contacts 204 and 206 within the case 202 from the manual actuator 210 and the solenoid 212. The contacts 204 and 206 are coupled to terminals 208 and 209.

Although the electrical switching device 200 is illustrated apparently as a cutaway view, in an embodiment, the electrical switching device 200 can have an open side. For example, the case 202 can be configured to include less than all sides to encapsulate the internal components. That is, the electrical switching device 200 can be manufactured with the contacts 204 and 206, solenoid 212, or the like within the case 202 exposed. In another embodiment, the electrical switching device 200 can be configured with a wall enclosing the contacts 204 and 206, solenoid 212, or the like. The electrical switching device 200 can be configured that such a wall is removable. For example, the electrical switching device 200 can be an off-the-shelf component. In particular, the electrical switching device can be an off the shelf component substantially lacking in structures to guide a blast. That is, a blast could exit from the case 202 of such an off-the-shelf electrical switching device 200 in an undetermined location on the case 202. However, by removing a lid, wall, side, or the like of such an electrical switching device 200, a blast can be guided as will be described in further detail below. Regardless, the electrical switching device 200 includes an opening in the case 202 that is configured to expose the contacts 204 and 206.

Although an opening in the case 202 has been illustrated as including substantially all of one side of the electrical switching device 200, the opening can include more or less of the case 202. For example, in an embodiment, the case 202 can include an opening that only exposes the contacts 204 and 206 within the case. In other words, the manual actuator 210, the solenoid 212, or the like within the case 202 may not be exposed through the opening. In another embodiment, multiple sides of the electrical switching device 200 can expose the internal components.

Although a particular type of electrical switching device has been described, namely an electrical switching device 200 with a solenoid 212 actuator, any actuator can be used. In addition, the electrical switching device 200 can be any switching device as described above.

Figure 11:
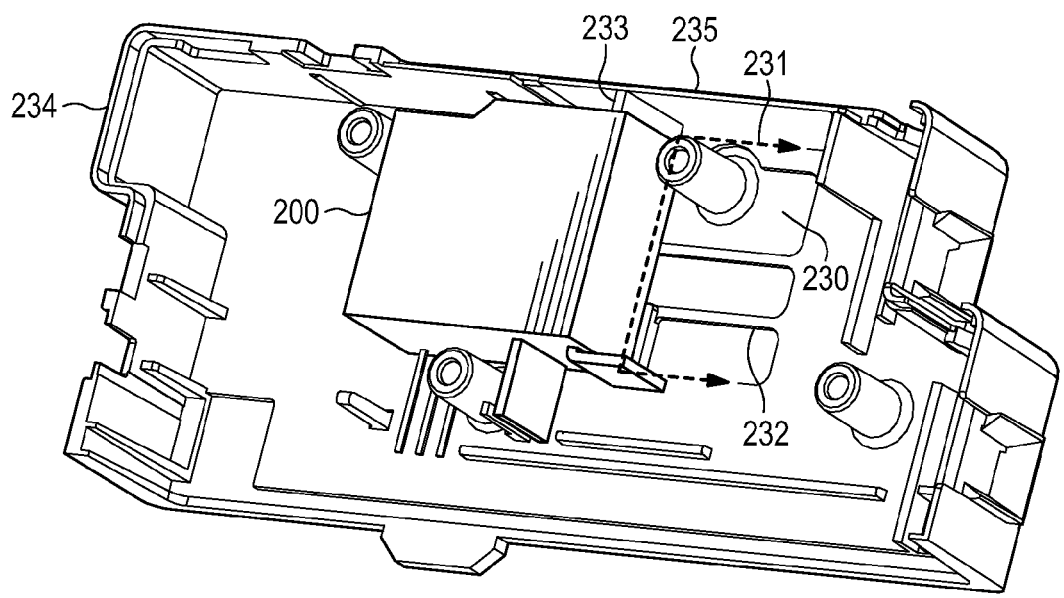
FIG. 11 is a cutaway view illustrating a duct according to some inventive principles of this patent disclosure.

FIG. 11 is a cutaway view illustrating a duct according to some inventive principles of this patent disclosure. In this embodiment, a case can be arranged to substantially encapsulate the electrical switching device 200. A side 234 of the case is illustrated. The electrical switching device 200 is disposed in contact with the side.

In the following description, various portions of an electrical switching device assembly will be described. However, portions that may have been previously described or portions that will be described later may or may not be illustrated. The illustrations may omit some portions for the sake of clarity.

The side 234 includes at least one duct 230. A duct 230 includes one or more structures that form an opening. The duct 230 is disposed adjacent to the electrical switching device 200. In particular, the duct 230 is disposed adjacent to the opening in the electrical switching device 200. Accordingly, as the opening is disposed to expose the contacts 204 and 206 of the electrical switching device 200, any blast from the contacts 204 and 206 can enter the duct 230.

In this embodiment, a rib 232 can be disposed in the ducts. The rib 232 can be disposed in the duct 230 such that the duct 230 has additional structural support. For example, the rib 232 can increase a stiffness of the side 234 in the duct 230. In an embodiment, the duct 230 can be formed from a recessed region of the side 234. The recessed region can be strengthened by ribs 232. Although one rib 232 has been described, in an embodiment, multiple ribs 232 can be disposed in the duct 230 as desired.

In another embodiment, the rib 232 can be configured to contact the case 202 of the electrical switching device 200. As a result, the rib 232 can provide an amount of support to the case 202. Moreover, in an embodiment, the rib 232 can but need not be aligned substantially parallel to an axis of the case 202. For example, the rib 232 can be disposed at an angle, such as at an angle directed towards a vent. Thus, the rib 232 can be configured to guide a blast from the electrical switching device 200.

In another embodiment, the side 234 can include a bulkhead 233. The bulkhead 233 is disposed extending from a top 235 of the side 234 to the case 202. As described above, the duct 230 can guide a blast from the electrical switching device 200. However, once the blast exits the electrical switching device 200, the blast can expand through any available opening. The bulkhead 233 can be configured to substantially isolate other electrical circuitry from the blast. That is, the bulkhead 233 can guide the blast away from travelling around the case 202.

Figure 12:
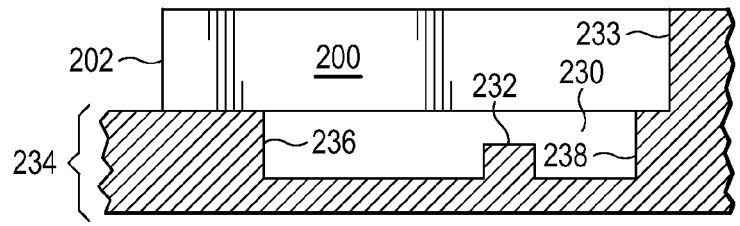
FIG. 12 is a cross-sectional view illustrating an example of an interface of the electrical switching device and case of FIG. 11.

FIG. 12 is a cross-sectional view illustrating an example of an interface of the electrical switching device and case of FIG. 11 along cross-section 231. The case 202 of the electrical switching device 200 is in contact with the side 234 of the case. Where the case 202 contacts the side 234, the side 234 can include walls 236 and 238. The walls 236 and 238 can be disposed to contact a perimeter of the case 202. Although walls of the side 234 have been described, in an embodiment, the perimeter of the case 202 can contact the surface of the side 234. That is, the side 234 need not have distinguishable walls to contact the case 202. However, the case 202 and the side 234 can still be in contact to aid in guiding a blast.

Accordingly, the contact of the case 202 and the side 234 forms the duct 230. Gasses, particles, or the like from a blast can be exhausted through the duct 230. In particular, in an embodiment, the case 202 of the electrical switching device 200 can form an expansion chamber coupled to the duct 230. As will be described in further detail below, the duct 230 can open on to such an expansion chamber. The blast can be guided into the expansion chamber where the gases can expand and cool.

Figure 13:
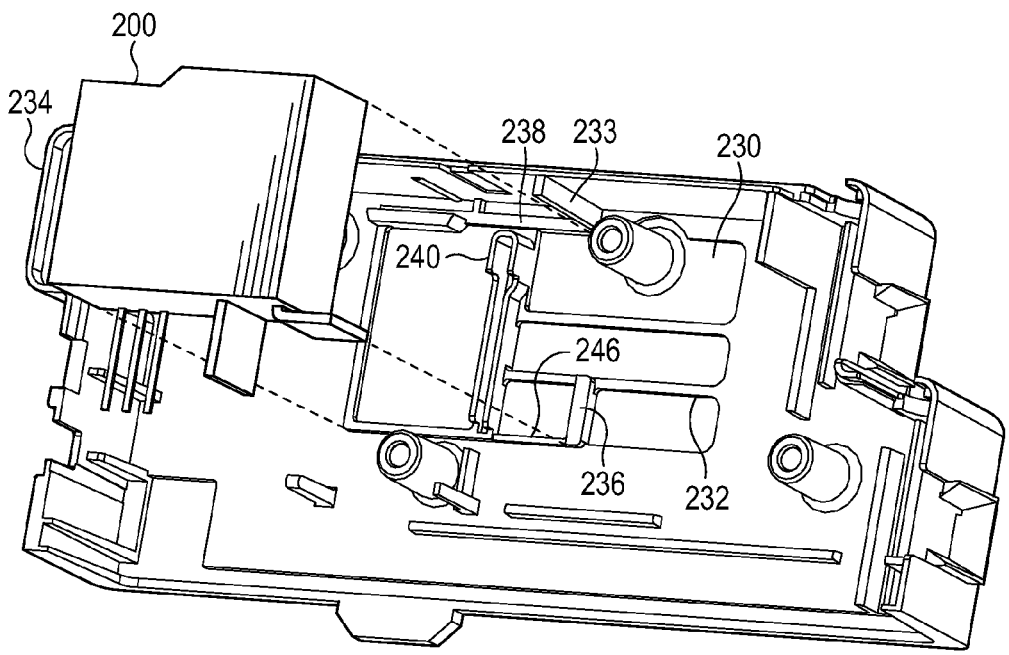
FIG. 13 is an exploded cutaway view of the embodiment of FIG. 11.

FIG. 13 is an exploded cutaway view of the embodiment of FIG. 11. In this view, the electrical switching device 200 is illustrated as offset from the side 234 to expose the wall 240. The wall 240 of the side 234 can be disposed within the case 202 of the electrical switching device 200.

That is, in an embodiment, the wall 240 can be configured to extend into the case 202 of the electrical switching device. The wall 240 can be configured to be disposed adjacent to the wall 216 of the case 202. Accordingly, the wall 216 of the case and the wall 240 of the side 234 can function as a bulkhead to contain a blast from the contacts 204 and 206.

Additional walls can also contact the case 202. For example, the walls 236, 238, and 246 of the side 234 and the corresponding perimeter of the case 202 of the electrical switching device 200 form additional walls. The case 202 can provide additional walls. Such walls can substantially contain a blast.

However, because of the interface between the case 202 and the duct 230, an opening remains to guide the blast from the chamber 244. As a result, the blast can be guided away from the electrical switching device 200.

Figure 14:
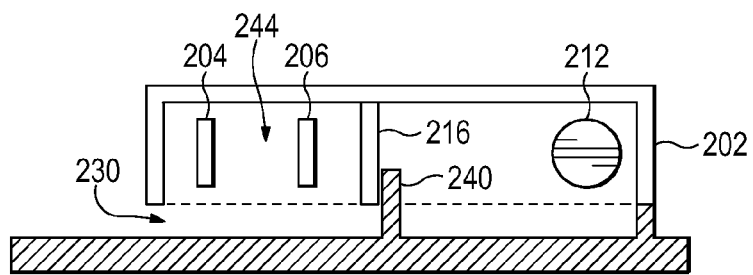
FIG. 14 is a cross-sectional view illustrating an example of an interface of a wall of the case and a wall of the electrical switching device.

FIG. 14 is a cross-sectional view illustrating an example of an interface of a wall of the case and a wall of the electrical switching device. As described above, a wall 216 can separate the contacts 204 and 206 from other components of the electrical switching device 200, such as the solenoid 212. The wall 240 of the side 234 extends into the electrical switching device 200. In this embodiment, the wall 240 partially extends into the electrical switching device 200. However, in other embodiments, the wall 240 can fully extend to the opposite side of the electrical switching device 200. In another embodiment the wall 240 can form a butt joint.

That is, the wall 240 of the side 234 and the wall 216 of the electrical switching device 200 form a wall of a chamber 244. Accordingly, a blast from contacts 204 and 206 can be guided substantially in a desired direction. Accordingly, any blast from the contacts 204 and 206 can be substantially prevented from traveling towards the solenoid 212 or other electronics. The blast can be guided through the duct 230.

In an embodiment, the duct 230 can be the only opening exposing the chamber 244 to a region external to the electrical switching device 200. For example, the contact of the walls, the case 202, and the like can be sealed together. Adhesives, welding, gaskets, or the like can seal the surfaces together. As a result, the only route for expanding gas and particles from the blast is through the duct 230.

In another embodiment, the duct 230 can be sized such that a majority of the blast is directed through the duct 230. For example, there can be some opening between the wall 216 of the electrical switching device 200 and the wall 240 of the side 234. Other interfaces, such as the interface of the walls 236 and 238 to the perimeter of the electrical switching device 200 can also have similar gaps, openings, or the like. As a result, a portion of the blast can escape beyond the junction of the walls.

However, the duct 230 can be sized such that a cross-sectional area of an opening created in the duct 230 between the side 234 and the electrical switching device 200 can be greater than a combination of similar cross-sectional areas of the gaps, openings, or the like described above. As a result, even though it is possible for the blast to escape through the other openings, a majority of the blast can escape through the duct 230.

As illustrated in FIG. 14, the wall 240 can be a planar wall. As illustrated in FIG. 13, the wall 240 can include multiple walls. Accordingly, the wall 240 can take any variety of configurations. That is, the wall 240 can be disposed on the solenoid 212 side of the wall 216. In another embodiment, the wall can straddle the wall 216. In another embodiment, the wall 240 can be disposed on the contact 206 side of the wall 216.

Figure 15:
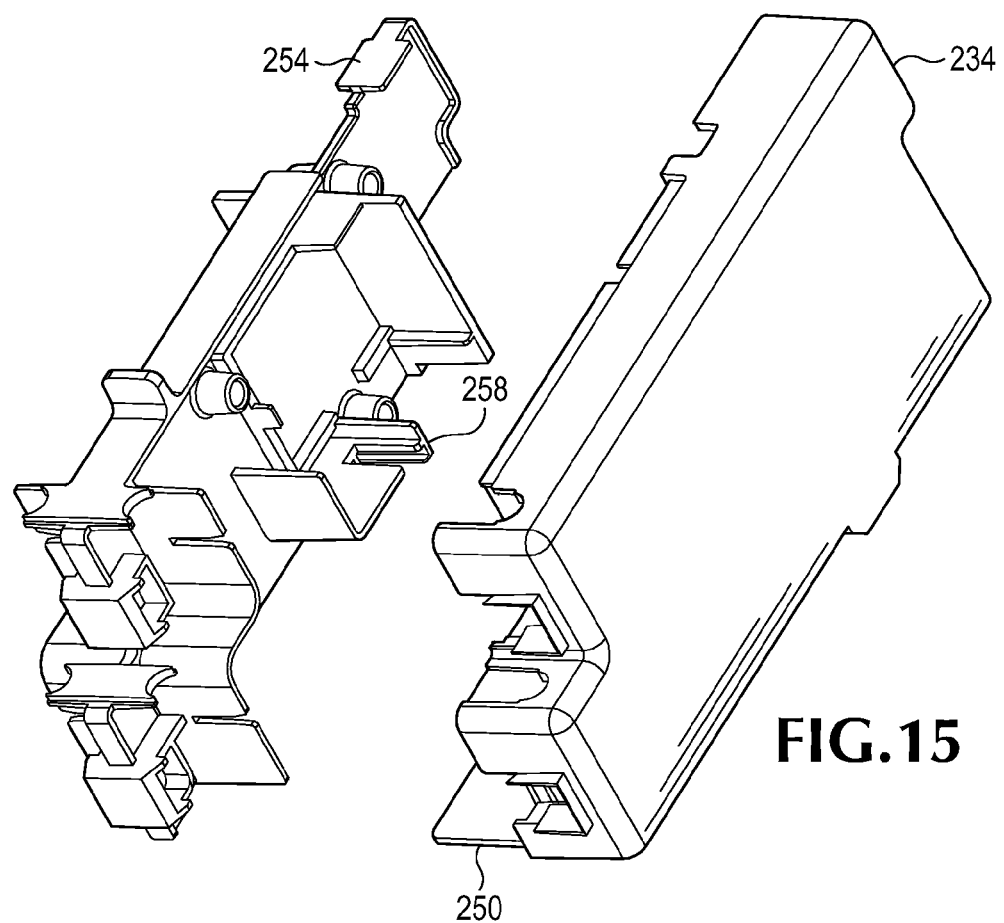
FIG. 15 is a cutaway view illustrating a bulkhead according to some inventive principles of this patent disclosure.
Figure 16:
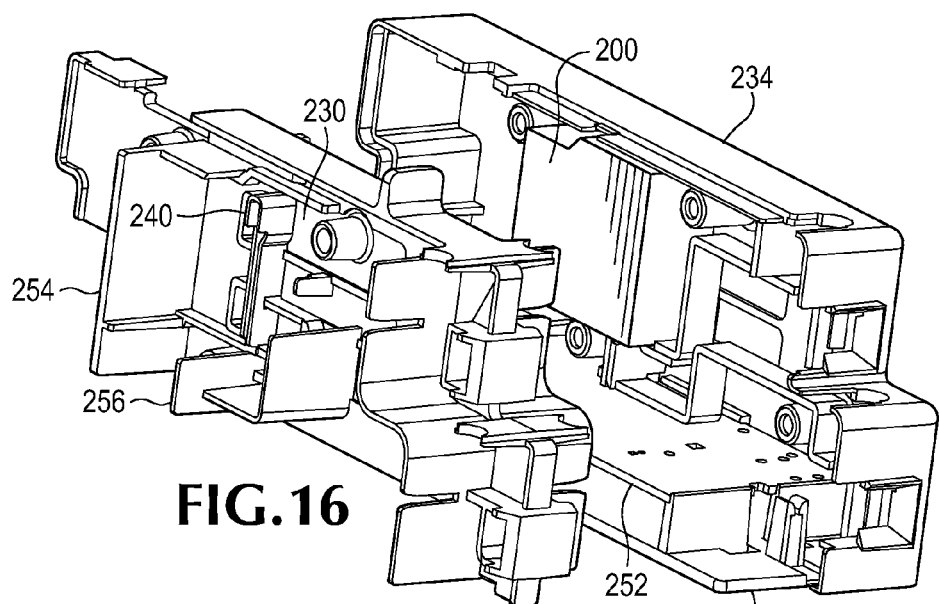
FIG. 16 is an exploded cutaway view of the embodiment of FIG. 15 from a different angle.

FIG. 15 is an exploded cutaway view illustrating a bulkhead according to some inventive principles of this patent disclosure. FIG. 16 is an exploded cutaway view of the embodiment of FIG. 16 from a different angle. Referring to FIGS. 15 and 16, in an embodiment, a first bulkhead 258 can extend between an electrical switching device 200 and a second bulkhead 252.

In this embodiment, the first bulkhead 258 is part of a center bulkhead 254 dividing the electrical switching component. When the center bulkhead 254 is assembled with the side 234, the bulkhead 258 is disposed between the electrical switching device 200 and the second bulkhead 252.

In an embodiment, the second bulkhead 252 is a circuit board. However, the second bulkhead 252 need not be a circuit board. For example, in an embodiment, the second bulkhead 252 can be a bottom 250 of the electrical switching component, the side 234, or the like. Thus, the bulkhead 258 can extend from the electrical switching device 200 to the bottom 250 of the electrical switching component. In another embodiment, the second bulkhead 252 can be another internal structure of the electrical switching component. Similar to the bulkhead 233 described above, the bulkhead 258 can substantially isolate other electrical components from the blast by guiding the blast away from the side of the case 202.

Figure 17:
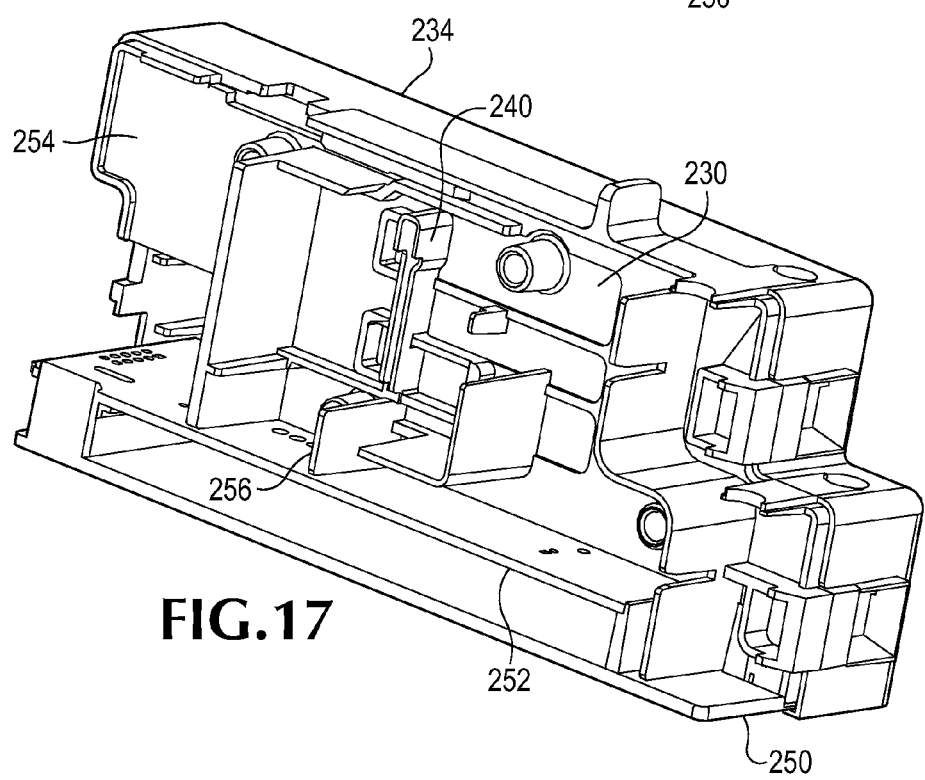
FIG. 17 is a cutaway view illustrating a circuit board in the assembly of FIG. 16 according to some inventive principles of this patent disclosure.

FIG. 17 is a cutaway view illustrating a circuit board in the assembly of FIG. 16 according to some inventive principles of this patent disclosure. In this view, the center bulkhead 254 is assembled with the side 234. The center bulkhead 254 can include a duct 230, a wall 240, and the like similar to the side 234. Accordingly, a second electrical switching device (not illustrated) similar to the electrical switching device 200 described above can be assembled with the center bulkhead. A bulkhead 256 can extend from the electrical switching device to the bulkhead 252.

In addition to guiding the blast, the various bulkheads can isolate other electrical circuitry from the blast. As described above, a blast can travel through duct 230. The blast can expand towards the circuit board 252. The blast can be blocked by the circuit board 252. Accordingly, electrical components, and in particular, electrical components that are electrically coupled to lower voltage circuitry, can be protected from the blast.

Although the bulkhead 256 has been illustrated as substantially in line with the wall 240, the bulkhead 256 can be disposed in other locations. For example, the bulkhead 256 can be disposed further away from the ducts 230. Additional walls such as the wall 242 can contact the perimeter of the case 202 of the electrical switching device 200. Accordingly, other components including the components of the electrical switching device 200 can be substantially isolated from the blast.

Although the duct 230 has been illustrated as disposed on the center bulkhead 254, the duct 230 can be disposed in other locations. In an embodiment, the duct 230 can be disposed on another side (not illustrated) of the electrical switching component opposite the side 234. In another embodiment, the ducts for multiple electrical switching devices 200 can be disposed on the center bulkhead 254. The openings of the electrical switching devices 200 can be disposed to open on to the duct 230, regardless of the particular location.

Figure 18:
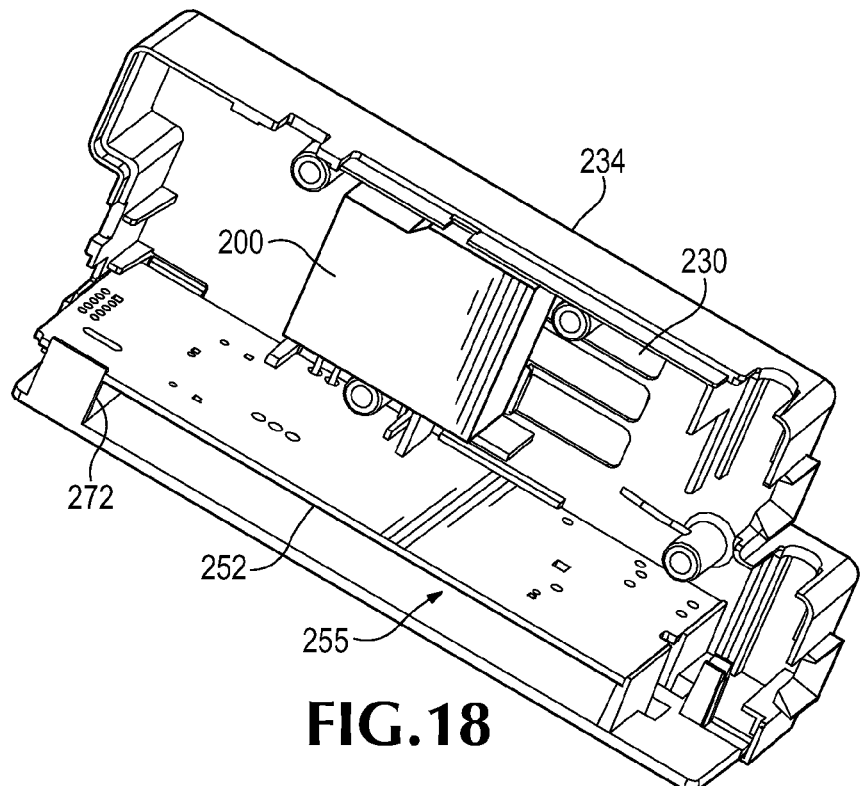
FIG. 18 is a cutaway view illustrating a circuit board according to some inventive principles of this patent disclosure.

FIG. 18 is a cutaway view illustrating a circuit board according to some inventive principles of this patent disclosure. In this embodiment, the circuit board 252 is mounted to the side 234 and the bottom 250. The circuit board 252 can be similarly mounted on another side of the case (not illustrated). The circuit board 252 is supported by stand-offs 270 and 272. The stand-offs 270 and 272 can be configured to offset the circuit board 252 from the bottom 250. As a result, circuitry can be disposed on side 255 of the circuit board 252.

In addition to supporting the circuit board 252, the stand-off 270 can substantially isolate the opposite side 255 of the circuit board 252. For example, the blast can be directed along the circuit board 252. The stand-off 270 can also be configured to direct such a blast away from the opposite side 255 of the circuit board 252.

Figure 19:
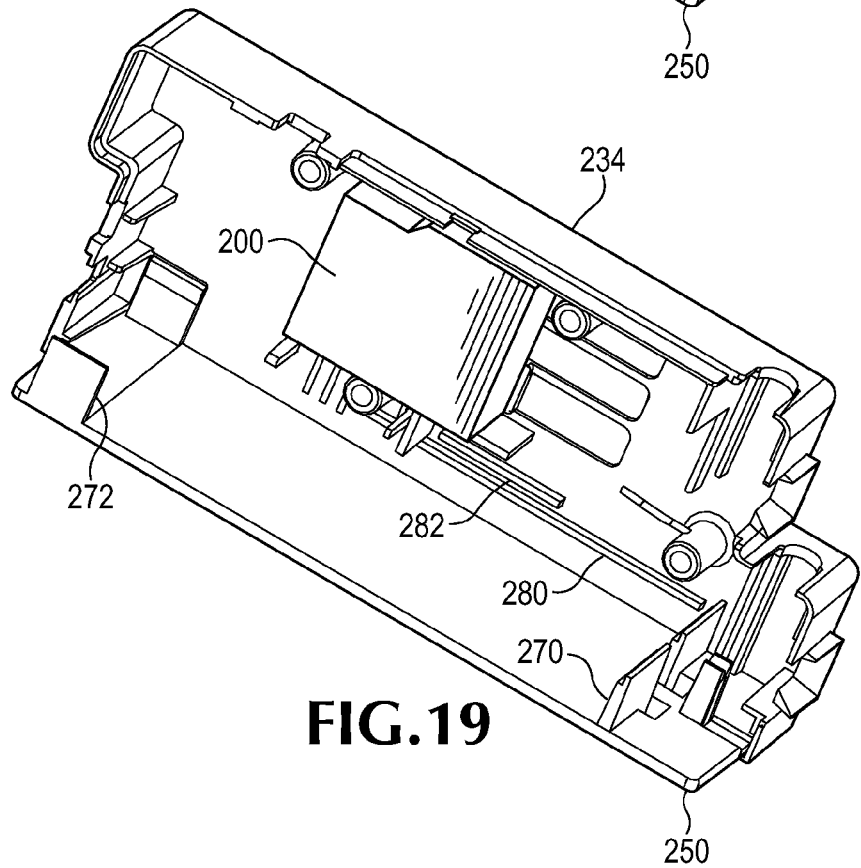
FIG. 19 is the cutaway view of FIG. 17 without the circuit board.

FIG. 19 is the cutaway view of FIG. 18 without the circuit board. Supports 280 and 282 can be configured to support an edge of the circuit board 252. For example, the circuit board 252 can be disposed between the supports 280 and 282.

The supports 280 and 282 can extend along a length of the circuit board 252. In particular, in an embodiment, the support 280 can extend along a length of the circuit board 252. Accordingly, when a blast increases the pressure on the circuit board 252, the circuit board 252 can be pressed on to the support 280. Thus, the blast can be substantially prevented from escaping around an edge of the circuit board extending along the length.

The support 280 can, but need not extend along the entire length of the circuit board 252. For example, the support can extend only along a length of the circuit board 252 where the circuit board 252 may encounter a blast. Similarly, the support 282 can, but need not extend along an entire length of the circuit board 252. For example, the support 282 can include periodically spaced supports along the edge. Although the support 280 has been illustrated as continuous along a length of the circuit board 252, the support 280 can include periodically spaced structures.

The supports 280 and 282 have been illustrated for an example. Other supports can be included on another side of the case, a center bulkhead 254, or the like. Accordingly, along a perimeter of the circuit board 252, the edges of the circuit board 252 can be substantially sealed. However, in an embodiment, the edges of the circuit board can, but need not be substantially sealed beyond a bulkhead, such as bulkhead 256 or 258. That is, if the blast is substantially isolated from a region of the circuit board 252, the edges in that region need not be substantially sealed.

Moreover, although the supports 280 and 282 have been illustrated as protrusions, the supports 280 and 282 can take different forms. For example, the supports 280 and 282 can include a slot, recessed region of the side 234, or the like configured to receive an edge of the circuit board 252. Any combination of such protrusions and recessed regions can be used.

Figure 20:
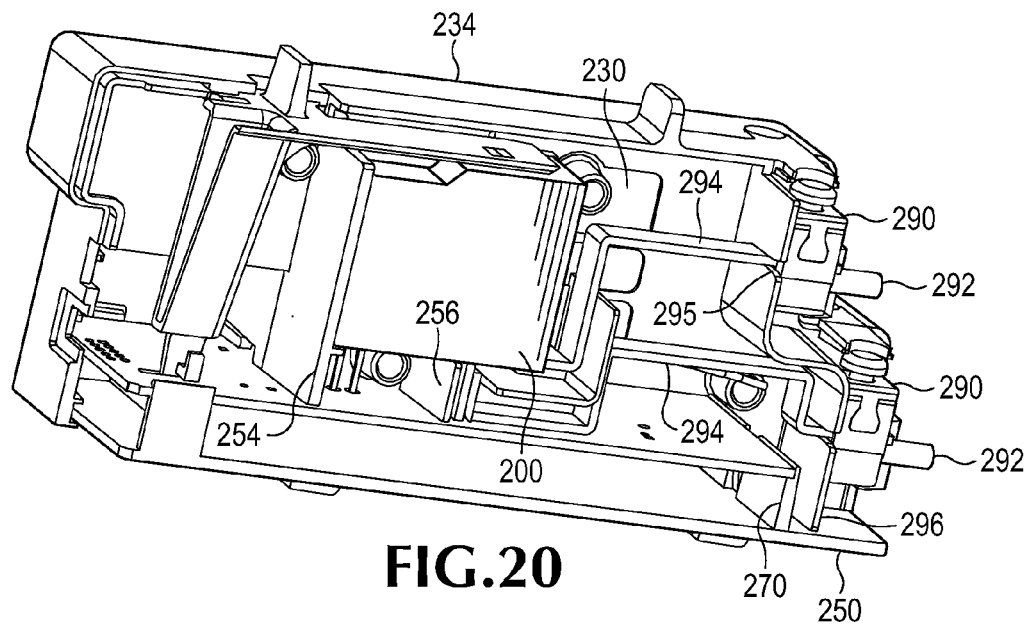
FIG. 20 is a cutaway view illustrating a bulkhead and terminals according to some inventive principles of this patent disclosure.

FIG. 20 is a cutaway view illustrating a bulkhead and terminals according to some inventive principles of this patent disclosure. In this embodiment, a second electrical switching device 200 is illustrated as assembled on the center bulkhead 254. The contacts of the electrical switching device 200 are coupled to conductors 294. The conductors 294 are coupled to corresponding terminals 290. The terminals 290 can be configured to be coupled to wiring 292.

Although the terminals 290 have been illustrated as screw terminals, the terminals 290 can have a variety of configurations. For example, the terminals 290 can be quick connect terminals, connectors, or the like.

A blast from the electrical switching device 200 can travel through the chamber including the conductors 294. However, a bulkhead 296 can be disposed between the electrical switching device 200 and the terminals 290. The conductors 294 can be disposed to extend through the bulkhead where the bulkhead 296 can be configured to substantially isolate the terminals 290 from a blast.

As illustrated in FIG. 20, the bulkhead 296 is part of the center bulkhead 254. However, a gap 295 can be present in the bulkhead 296 to allow for placement of the conductors 294. The gap 295 can be substantially filled by a corresponding structure on another side (not illustrated) of the electrical switching component. Accordingly, although the bulkhead 296 has been described as substantially isolating the terminals 290 from a blast, the isolation can include a contribution from the additional structure of the other side. Moreover, although the bulkhead 296 has been illustrated as an internal bulkhead, the bulkhead 296 can be formed from a side of the case, such as side 234. That is, in an embodiment, the bulkhead 296 can be a wall of the case.

Figure 21:
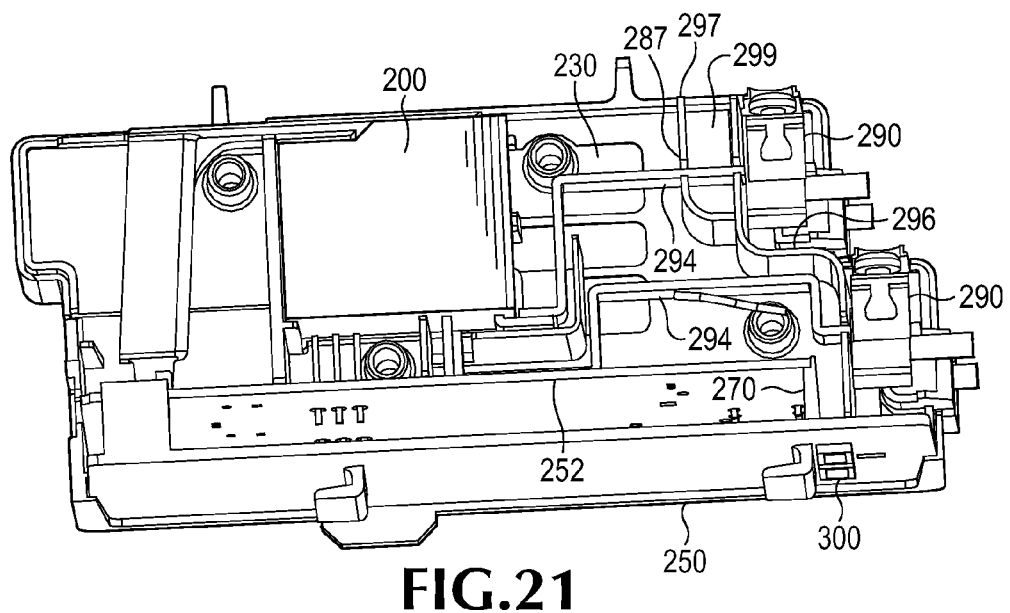
FIG. 21 is the cutaway view of FIG. 20 rotated to illustrate a vent according to some inventive principles of this patent disclosure.

FIG. 21 is the cutaway view of FIG. 20 rotated to illustrate a vent according to some inventive principles of this patent disclosure. As described above, a vent 300 can be disposed in the case to allow a blast to vent to outside of the case. In this embodiment, the vent 300 is disposed between the electrical switching device 200 and the bulkhead 296. However, in other embodiments, the vent 300 can be disposed anywhere such that there is a substantially continuous path between the electrical switching device 200 and the vent.

Accordingly, a blast can occur in the electrical switching device 200. The blast can be guided through the ducts 230. The ducts 230 can vent into the chamber defined by the center bulkhead 254, the circuit board 252, the bulkhead 256, the bulkhead 296, and the other side (not illustrated). As the chamber is larger than the chamber 244 of the electrical switching device 200, the blast can expand, reducing the temperature and pressure. The gap between the stand-off 270 and the bulkhead 296 directs the blast towards the vent 300 and towards an exterior of the electrical switching component.

Similar to the size of the duct relative to the size of any opening created by the junction of the case 202 of the electrical switching device 200 and the side 234, the size of the vent 300 can be selected such that a cross-sectional opening of the vent 300 is larger than a combination of other gaps, openings, or the like between the various sides, circuit board, bulkheads, and the like guiding the blast. Accordingly, a substantial amount of the blast can be guided out of the vent 300.

In an embodiment, the electrical switching component can include multiple bulkheads disposed between the electrical switching device 200 and the terminals 290. As illustrated in FIG. 21, the conductor 294 extends through bulkhead 297. In this embodiment, only one of the conductors 294 passes through a bulkhead 297 in addition to the bulkhead 296. However, in other embodiments, the other conductor 294, each of the conductors 294, or the like can pass through multiple bulkheads between the electrical switching device 200 and the terminals 290.

In an embodiment, the conductor 294 that is furthest from the vent 300 can pass through bulkhead 297. A blast guided by the ducts 230 and directed towards the bulkhead 297 may not have fully expanded and could have a pressure high enough to blow past an interface of the conductor 294 and the bulkhead 296. However, the bulkhead 297 can redirect the blast such that the blast can further expand, reduce in pressure, temperature, or the like, before the blast reaches an interface exposing the outside of the electrical switching component. That is, the shock front of the blast can be guided such that pressure is reduced before the blast has an opportunity to escape the electrical switching component.

Moreover, in an embodiment, the bulkhead 297 can create a substantially separate chamber 299. The chamber 299 can be formed from a curvature of the bulkhead 297 towards the bulkhead 296. Other structures such as the center bulkhead 254 or the like can create other sides of the chamber 299. Accordingly, a blast must travel through multiple chambers, experiencing an expansion out of the duct 230, a constriction when passing through a gap 287, another expansion in chamber 299, and so on. Multiple chambers such as chamber 299 can be created such that a blast travelling towards the terminal 209 can experience such expansions and constrictions. As a result, the interfaces of the sides, bulkheads, walls, or the like can be more likely to contain the blast and guide it to the intended vent 300.

Figure 22:
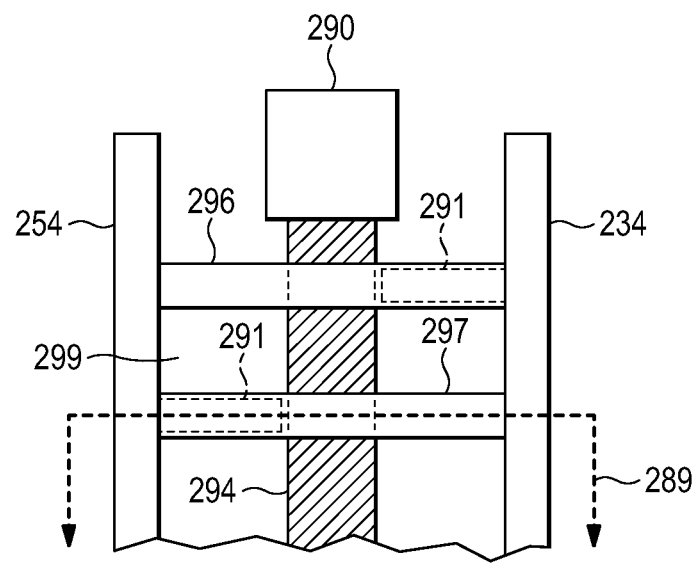
FIG. 22 is a cross-sectional view illustrating a second chamber according to some inventive principles of this patent disclosure.
Figure 23:
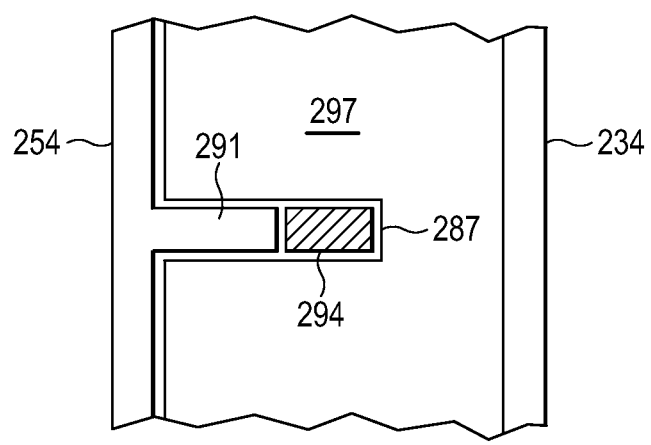
FIG. 23 is a cross-sectional view illustrating a wall of the second chamber of FIG. 22 according to some inventive principles of this patent disclosure.

FIG. 22 is a cross-sectional view illustrating a second chamber according to some inventive principles of this patent disclosure. FIG. 23 is a cross-sectional view along plane 298 illustrating a wall of the second chamber of FIG. 22 according to some inventive principles of this patent disclosure. In the embodiment of FIG. 21, the bulkheads 299 and 296 are illustrated as including gaps 287 and 295 allowing the conductor 294 to be assembled in the electrical switching component. In contrast, in the embodiment of FIG. 22, the corresponding gaps are on opposite sides of the conductor 294.

For example, the center bulkhead 254 includes the bulkhead 296. The bulkhead 296 extends towards the side 234. As described above, a gap 295 is present to allow assembly. A tab 291, illustrated in phantom, can substantially fill the gap 295, substantially sealing that wall of the chamber 299. In contrast, the gap 287 of the bulkhead 297 is disposed on an opposite side of the conductor 294. Moreover, the bulkhead 297 is disposed on the side 234, not on the center bulkhead 254 as illustrated in FIG. 21. A tab 291 of the center bulkhead 254 extends to fill the gap 297 of the bulkhead 297.

The cross-sectional view along plane 289 is illustrated for bulkhead 297. However, the orientation of the gap 295 and the bulkhead 296 are on opposite sides for a similar cross-section. A blast can escape through the gaps in such structures. However, a blast travelling along conductor 294 will not have a substantially straight path through chamber 299. That is, because of the orientation of the gaps, the blast can change direction, deposit suspended particles on the walls, and further isolate the terminal 290 and any wiring from the blast.

Figure 24:
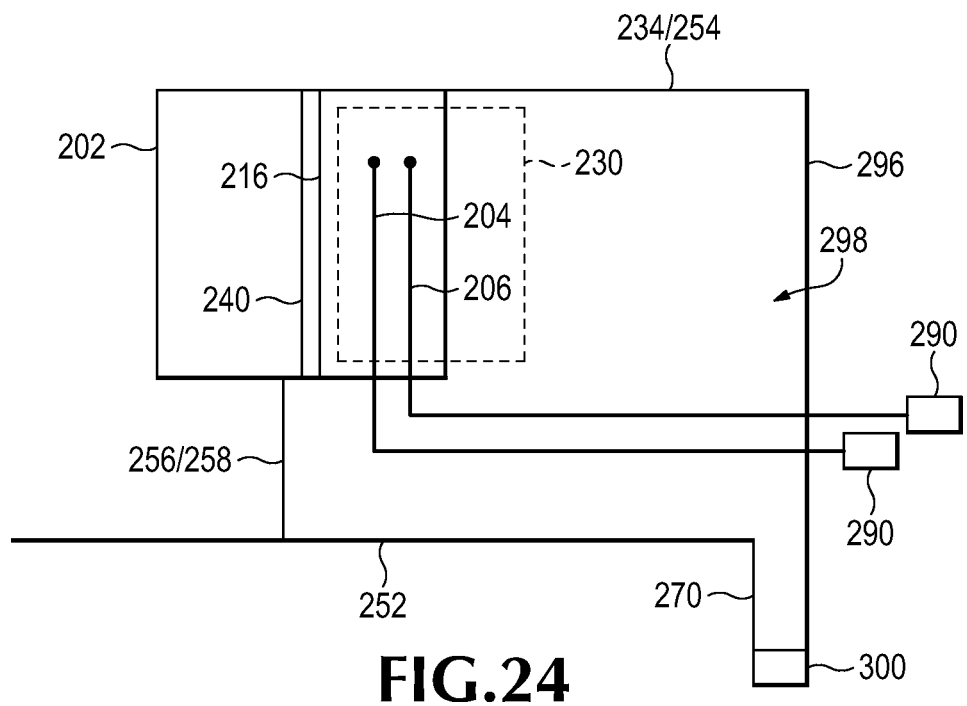
FIG. 24 is a block diagram illustrating an example of guiding a blast according to some inventive principles of this patent disclosure.

FIG. 24 is a block diagram illustrating an example of guiding a blast according to some inventive principles of this patent disclosure. In this embodiment various components described above are conceptually illustrated to show a path traveled by a blast. A case 202 of an electrical switching device 200 includes the contacts 204 and 206 where a blast occurs. Walls 216 and 240 contain the blast and, with the case 202, guide the blast through the ducts 230 into an expansion chamber 298.

The chamber 298 is bounded by the center bulkhead 254, a corresponding side such as side 234, bulkhead 296, bulkhead 256 or 258, circuit board 252, and stand-off 270. In one example, a blast can be deflected by the center bulkhead 254 or side 234, directed towards the vent 300 by bulkhead 298. In another example, the blast can be deflected by walls 256 or 258, and circuit board 252 towards the vent 300. Accordingly, in an embodiment, each of the various walls, bulkheads, circuit boards, and the like contribute to containing the blast and guiding it towards the vent 300.

Moreover, in an embodiment, the electrical switching component can form a module. That is, the electrical switching device 200, which has its own case 202, can be encapsulated within the case formed by the various walls, bulkheads, and the like described above to form a modular component.

Figure 25:
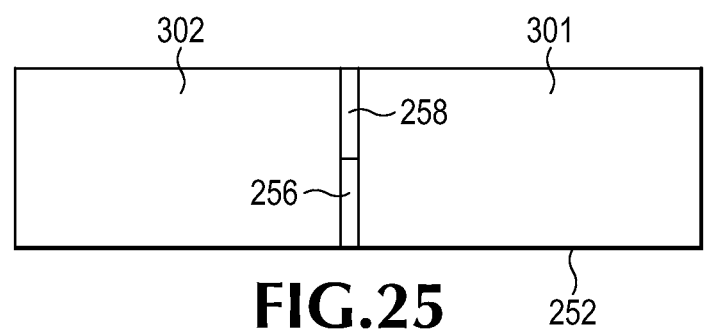
FIG. 25 is a block diagram illustrating various zones according to some inventive principles of this patent disclosure.

FIG. 25 is a block diagram illustrating various zones according to some inventive principles of this patent disclosure. As described above, walls 256 and 258, and stand-off 270 can substantially isolate portions of the circuit board 252 from a blast. FIG. 25 illustrates a top view of the circuit board 252. Walls 256 and 258 can divide the circuit board 252 into two different zones 301 and 302.

Zone 301 can be a high voltage circuit zone. That is, high voltage circuitry, relays, switches, or the like can be disposed in circuit zone 301. For example, various components that may be coupled to the electrical switching device 200, the conductors 294, or the like within the electrical switching component can be coupled to the circuit board 252 in zone 301. In addition, circuit zone 301 can include the portion of the circuit board 252 that can deflect a blast as described above. Accordingly, as a blast can create short circuits between a line terminal of the electrical switching component, circuitry within the zone 301 could be subjected such line voltages. Accordingly, the circuitry in zone 301 could be exposed to a voltage range including high voltages.

In contrast, circuit zone 302 can be substantially isolated from the blast. As described above, the walls 256 and/or 258 can prevent an amount of the blast from reaching circuitry within zone 302. Accordingly, the circuitry in zone 302 can be exposed to a voltage range including maximum voltages lower than that of circuit zone 301. That is, even after a blast, short circuits caused by the blast may not cause high voltages to be conducted to circuitry in zone 302. Thus, low voltage circuitry, processors, interfaces, or the like can be placed in zone 302.

Figure 26:
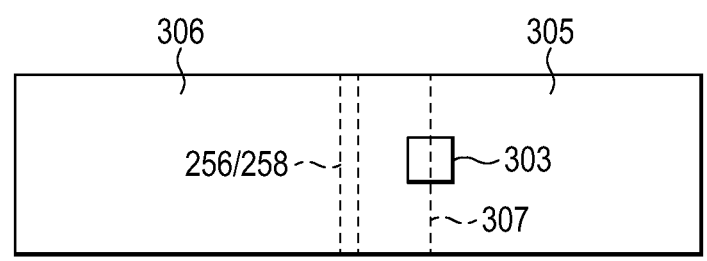
FIG. 26 is a block diagram illustrating additional zones of the circuit board of FIG. 25 according to some inventive principles of this patent disclosure.

FIG. 26 is a block diagram illustrating additional zones of the circuit board of FIG. 25 according to some inventive principles of this patent disclosure. FIG. 24 illustrates the opposite side of circuit board 252. Walls 256 and 258 are illustrated in phantom for reference.

This side of the circuit board 252 includes zones 305 and 306. The zones 305 and 306 can be divided by an isolator 303. The isolator 303 can form a division 307 between the zones 305 and 306. The isolator 303 can be a variety of devices. For example, the isolator 303 can be an opto-isolator, a transformer, or the like such that current is substantially prevented from flowing directly across the isolator 303.

In zone 305, circuitry can be present that does not operate in the high voltage range of zone 301. However, zone 305 can include through-hole components that penetrate the circuit board 252. As a result, the components can have electrical contact with zone 301 on the opposite side. As a result, in the event of a blast, a short circuit in zone 301 can cause a high voltage to appear on circuitry in zone 305.

Accordingly, at least one isolator 303 can allow signals to pass between zones 305 and 306. Any high voltage in zone 305 can be contained in zone 305. Note that as the blast can be substantially isolated from this side of the circuit board 252, materials that can create short circuits will likely not be deposited in either zones 305 or 306. As a result, a short will likely not be created across the isolator 303. Thus, the isolator 303 can bridge the division 307 of zones 305 and 306.

Figure 27:
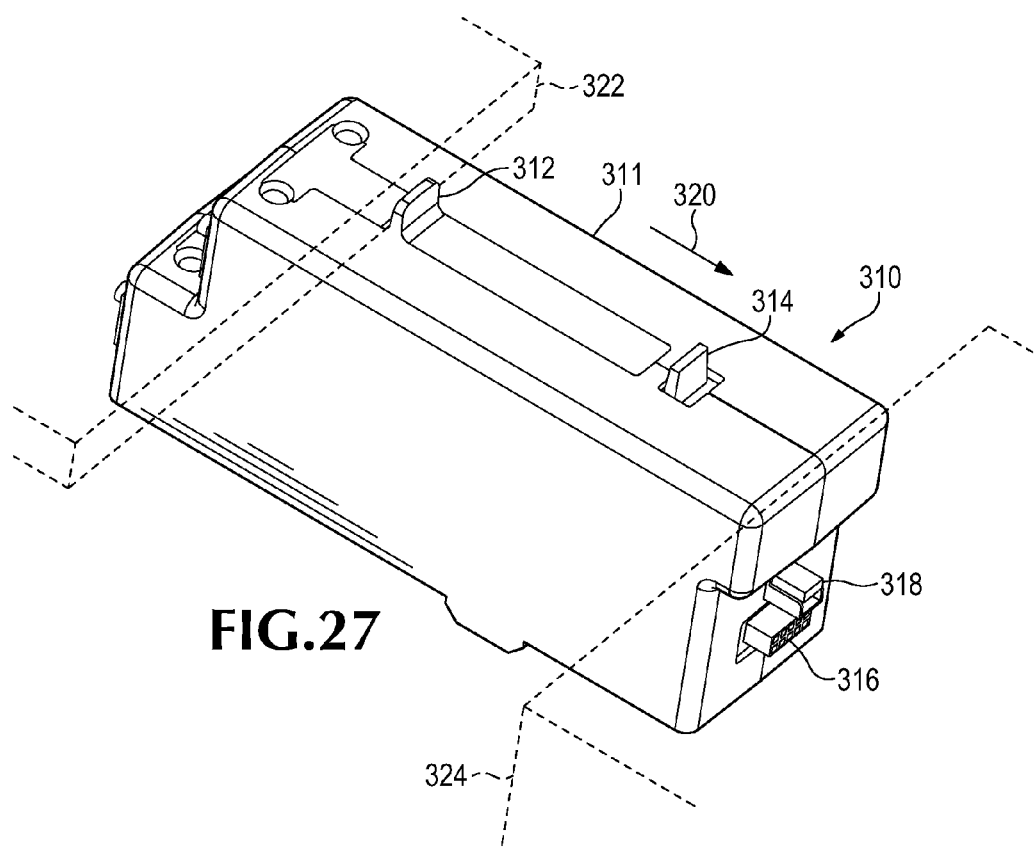
FIG. 27 is a perspective view illustrating an electrical switching component according to some inventive principles of this patent disclosure.

FIG. 27 is a perspective view illustrating an electrical switching component according to some inventive principles of this patent disclosure. In this embodiment, an electrical switching component 310 can include a case 311 and a connector 316. An additional connector 318 is illustrated; however, any number of connectors can be used.

The connector 316 is disposed on a first end of the case such that the connector 316 can be coupled to a second connector (not illustrated) on a mounting site 324 by moving the case 311 in a direction 320. That is the connector 316 is disposed on the case 311 such that movement on direction 320 can engage the connector 316.

The case 311 includes a retaining structure 312. The retaining structure 312 is configured to be constrained such that movement of the case in the direction 320 is limited. For example, a panel 322 of an enclosure containing the electrical switching component 310 can be installed after the electrical switching component 310 is mounted on the mounting site 324. As a result, the movement of the electrical switching component 310 is constrained along direction 320. That is, the mounting site 324 can prevent the electrical switching component 310 from moving in the direction of the arrow of direction 320 while the plate 322 can be configured to prevent the electrical switching component 310 from moving in a direction opposite the arrow of direction 320.

As illustrated, the retaining structure 312 can include a protrusion extending from a surface of the case 311. The plate 322 can be disposed on a side of the retaining structure 312 opposite the mounting site 324.

In another embodiment, the retaining structure 312 can include a recessed region within a surface of the case 311. The recessed region can be configured to receive a corresponding tab, protrusion, or other structure of the plate 322.

In another embodiment, the retaining structure 312 can include mounting locations for a fastener. For example, a fastener can include a screw, brad, bolt, nut, or the like. The case 311 can include a threaded hole configured to receive a screw, for example. Accordingly, the plate 322 can be mounted to the case 311 using the retaining structure 312.

In an embodiment, the electrical switching component 310 can include a manual actuator 314 coupled to an electrical switching device of the electrical switching component 310 as described above. The manual actuator 314 can be configured to change a state of the electrical switching device as the manual actuator is actuated in the direction 320.

Since the manual actuator 314 can be actuated in the direction 320, the force applied to actuate the manual actuator 314 has the potential to dislodge the electrical switching component 310 from the mounting site 324. However, since the retaining structure 312 is coupled with the plate 322, limiting the movement along direction 320, such actuation of the manual actuator 314 can reduce a chance that the force applied will dislodge the electrical switching component 310.

Figure 28:
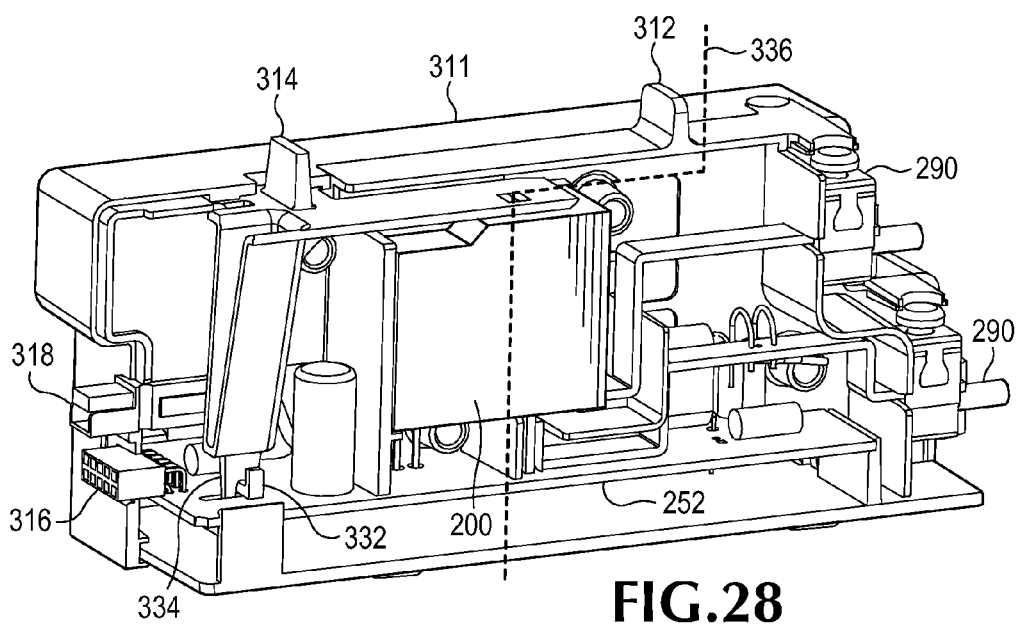
FIG. 28 is a cutaway view illustrating an actuator according to some inventive principles of this patent disclosure.

FIG. 28 is a cutaway view illustrating an actuator according to some inventive principles of this patent disclosure. The manual actuator 314 can include an end 334. The end 334 can be configured to actuate a photointerruptor 332. The photointerruptor 332 can be disposed on the circuit board 252 described above. Accordingly, when the manual actuator 314 is actuated, such actuation can be sensed. In addition, the manual actuator 314 can be configured to move when the electrical switching device 200 is electrically actuated. That is, when the electrical switching device 200 is actuated by an electronic signal, the electrical switching device 200 can cause the manual actuator 314 to be actuated. Such actuation can also be sensed by the photointerruptor 332 and interpreted as the position of the manual actuator 314 and hence, the state of the electrical switching device 200. That is, from the position, a state of the electrical switching device can be sensed. For example, not only can an on/off state be sensed, but with an appropriately configured sensor, other states, such as a tripped state can be sensed.

In an embodiment, the manual actuator 314 need not be present, yet the actuation of the electrical switching device 200 can still be sensed. For example, the manual actuator 314 can be replaced with a linkage configured to couple contacts or other structures of the electrical switching device 200 to the photointerruptor 332. Thus, the actuation can be sensed without a manual actuator 314. However, in another embodiment, such linkages can include the manual actuator 314.

Although a photointerruptor has been described above, other types of sensors can be used. For example, a mechanical contact sensor that makes or breaks an electrical circuit can be used. A digital position encoder can be used to sense the position of the end 334. Any sensor that can sense position, movement, acceleration, or the like can be used.

As described above, the electrical switching component 310 can have both high voltage circuitry and low voltage circuitry. In an embodiment the high voltage circuitry can be substantially isolated from a user. That is, a user may be required to remove panels, cases, enclosures, or the like beyond that used in normal operations to access the high voltage circuitry.

Accordingly, the retaining structure 312 can be disposed on the case 311 to facilitate such isolation from a user. For example, as described above, the assembly can have various high voltage circuitry, conductors, or the like. Line 336 conceptually divides the electrical switching component 310 into high voltage and low voltage regions. At one end of the electrical switching component 310 with the terminals 290, high voltage circuitry is exposed through an opening of the case 311. At another end of the electrical switching component 310 with the connectors 316 and 318, low voltage circuitry is exposed through the case 311.

The retaining structure 312 can be disposed on the case 311 between such openings. Accordingly, when secured by the panel 322 described above or other similar structure, the high voltage electrical circuitry and, in particular, the exposed contacts such as the terminals 290 of the high voltage circuitry can be substantially isolated from a user.

Figure 29:
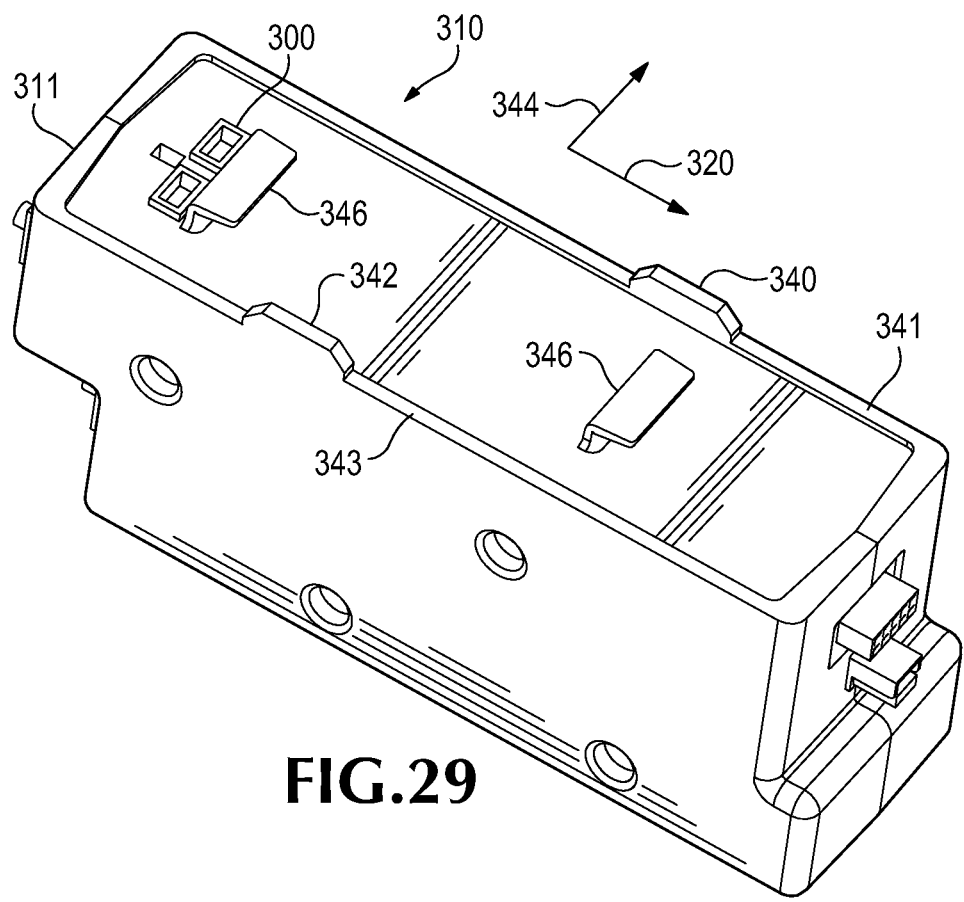
FIG. 29 is a perspective view illustrating a case according to some inventive principles of this patent disclosure.

FIG. 29 is a perspective view illustrating a case according to some inventive principles of this patent disclosure. In this embodiment, the case 311 of the electrical switching component 310 includes a protrusion 340 extending from a surface of the case 311. The protrusion 340 can extend from a side of the case opposite the retaining structure 312.

The protrusion 340 can be aligned along the direction such that when the protrusion is disposed in a corresponding opening, the case is substantially constrained in a second direction 344 substantially orthogonal to the first direction 320. The protrusion 340 can be aligned such that the case 311 is not substantially constrained when disposed in the corresponding opening in direction 320.

For example, the opening can be a slot aligned with a long axis in direction 320. The protrusion 340 can have a width in direction 344 substantially equal to the width of the slot, while a length of the protrusion 340 is less than a corresponding length of the slot in direction 320. Thus, the electrical switching component 310 can have a range of motion along direction 320 while being substantially constrained in direction 344.

In an embodiment, the case 311 can include a second protrusion 342. The second protrusion can be disposed on the same side of the case 311 as the first protrusion 340 opposite the retaining structure 312. The second protrusion 342 can, but need not be shaped similarly to the first protrusion. The second protrusion 342 can be similarly formed to constrain the motion of the electrical switching component 310 when disposed in a corresponding opening as is the first protrusion 340.

The first protrusion 340 and the second protrusion 342 can be disposed on opposite edges of case 311. For example, the first protrusion 340 can be disposed on a first edge 341 of the case 311. The second protrusion 342 can be disposed on a second edge 343. Although the edges 341 and 343 can be on the same side of the case 311 opposite the retaining structure 312, the edges 341 and 343 can be on opposite edges of that side.

In an embodiment, the protrusions 340 and 342 can be offset from each other along direction 320. That is, along the direction of insertion for mounting the electrical switching component 310, the protrusions 340 and 342 can be offset. However, in other embodiments, the protrusions 340 and 342 need not be offset.

In an embodiment, mounting ears 346 can be disposed on the case 311 to mount the electrical switching component 310 to a mounting location. For example, the mounting location can have an opening configured to receive the mounting ears 346.

Figure 30:
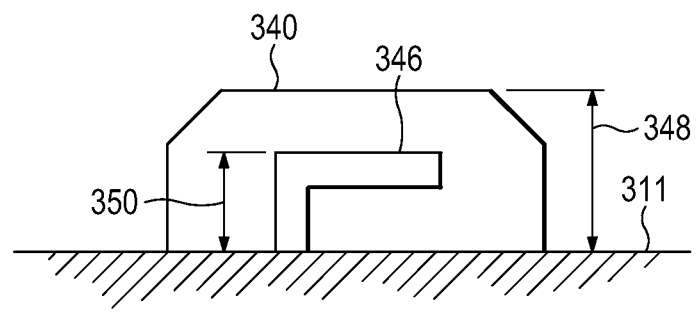
FIG. 30 is a side view illustrating the protrusion and mounting ear of FIG. 29.

FIG. 30 is a side view illustrating the protrusion and mounting ear of FIG. 29. The protrusion 340 can have a height 348 that is greater than a height 350 of the mounting ear 346. Accordingly, in an embodiment, when being mounted on a mounting site, the protrusion 340 can contact the mounting site prior to the mounting ear 346. As a result, when the protrusion 340 is aligned with a corresponding opening, the protrusion 340 can pass through the opening, allowing the mounting ear 346 to approach the mounting site.

Figure 31:
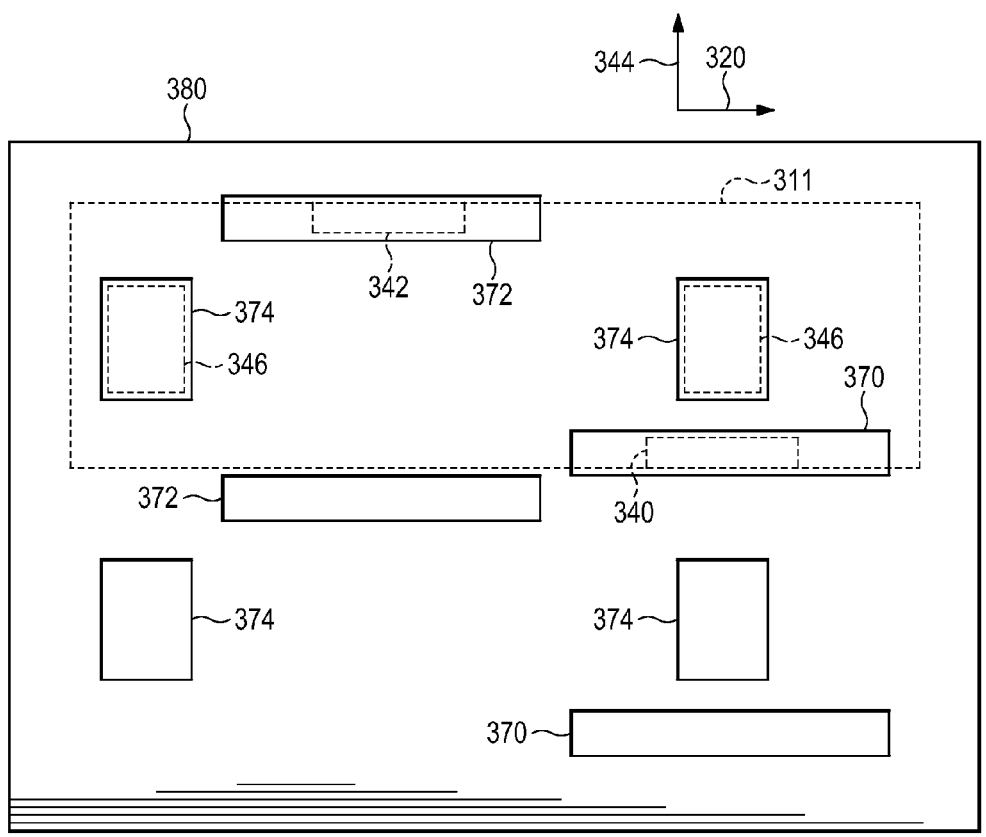
FIG. 31 is a plan view of an example of a mounting site for the assembly of FIG. 29.

FIG. 31 is a plan view of an example of a mounting site for the assembly of FIG. 29. In this embodiment, the side of the case 311 opposite the retaining structure 312 is illustrated in phantom. FIG. 31 illustrates a state where the electrical switching component 310 is mounted on the mounting site 380, but the mounting ears 346 are not engaged. The mounting site 380 includes openings 370, 372, and 374. The protrusions 340 and 342 are disposed in openings 370 and 372, respectively. The mounting ears 346 are disposed in the openings 374.

As described above, the protrusions 370 and 372 can be higher than the mounting ears 346. Accordingly, when the electrical switching component 310 is brought into contact with the mounting site 380, the contact will be with the protrusions 340 and 342.

In an embodiment, the openings 370 and 372 can be longer along direction 320 than necessary to accommodate a range of motion of the electrical switching component 310 when the mounting ears 346 are disposed in the openings 374. That is, a greater amount of misalignment of the protrusions 340 and 342 relative to an installed location can be tolerated with the openings 370 and 372.

Accordingly, the protrusions 340 and 342 can engage with the openings 370 and 372 with an amount of misalignment between the mounting ears 346 and the openings 374. However, this does not mean that the mounting ears 346 cannot engage the openings as the protrusions 340 and 342 can engage with the openings 370 and 372. If the protrusions 340 and 342 engage with the openings 370 and 372 with the mounting ears 346 misaligned, the mounting ears 346 can contact the mounting site 380 and slide along as the electrical switching component 310 is moved.

As the protrusions 340 and 342 are engaged with the openings 370 and 372, the motion of the electrical switching component 310 is constrained. Thus, the motion of the assembly, is limited in direction 344; however, the motion in direction 320 is possible due to the relative lengths of the protrusions 340 and 372 and the openings 370 and 372. The electrical switching component 310 can be moved along direction 320 until the mounting ears 346 pass through the openings 374. The electrical switching device 310 can then be moved again along direction 320 to engage the mounting ears 346 with the mounting site 380.

Although the mounting ears 346 have been used as an example, other mounting structures can be used. For example, clips, hooks, or the like can be used to mount the electrical switching device 310 to the mounting site 380.

The inventive principles of this patent disclosure have been described above with reference to some specific example embodiments, but these embodiments can be modified in arrangement and detail without departing from the inventive concepts. For example, in some embodiments, a circuit board may be part of the electrical switching component, while in other embodiments, a circuit board may be all or part of a chassis to which the component is mounted. As another example, the switching device need not be a simple on-off device, but may provide continuous control such as that provided by an SCR, triac, transistor, etc. Such changes and modifications are considered to fall within the scope of the following claims.

The invention claimed is:

1. An apparatus, comprising:
an electrical switching component including an electrical switching device to control current to a load, a case substantially encapsulating the electrical switching device, a retaining structure, and a first connector disposed on a first end of the case such that the first connector can be coupled to a second connector on a mounting site by moving the case in a first direction, a first protrusion extending from a side of the case opposite the retaining structure, the first protrusion aligned along the first direction such that when the first protrusion is disposed in a corresponding opening, the case is constrained in a second direction substantially orthogonal to the first direction;
wherein the retaining structure of the case is configured to be constrained such that movement of the case in a second direction opposite the first direction is limited.

2. The apparatus of claim 1, further comprising a manual actuator coupled to the electrical switching device and extending from the case, the manual actuator configured to change a state of the electrical switching device as the manual actuator is actuated in the first direction.

3. The apparatus of claim 1, wherein the retaining structure includes a protrusion extending from a surface of the case.

4. The apparatus of claim 1, wherein the retaining structure includes a recessed region within a surface of the case.

5. The apparatus of claim 1, wherein:
the case includes first circuitry constrained to a first voltage range and a first opening exposing the first circuitry;
the case includes second circuitry constrained to a second voltage range extending higher than the first voltage range and a second opening exposing the second circuitry; and
the retaining structure is disposed on the case between the first opening and the second opening.

6. The apparatus of claim 1, the apparatus further comprising:
a second protrusion extending from the side of the case opposite the retaining structure, the second protrusion aligned along the first direction such that when the second protrusion is disposed in a corresponding opening, the case is constrained in a second direction substantially orthogonal to the first direction;
wherein:
the first protrusion is disposed on a first edge of the side of the case opposite the retaining structure;
the second protrusion is disposed on a second edge of the side of the case opposite the retaining structure; and
the first edge is opposite the second edge.

7. The apparatus of claim 6, wherein the first protrusion and the second protrusion are offset from each other along the first direction.

8. The apparatus of claim 7, wherein:
the case is an outer case;
the electrical switching device comprises:
an inner case,
a plurality of contacts disposed in the inner case, and
an opening in the inner case disposed to expose the contacts; and
the outer case is arranged to duct a blast from the opening of the inner case of the electrical switching device to a flame-resistant material to at least partially contain the blast.

9. A method, comprising:
moving an electrical switching component in a first direction to engage an electrical switching component with a mounting site; and
engaging a panel with a retaining structure of the electrical switching component such that movement of the electrical switching component is constrained along a second direction opposite the first direction.

10. The method of claim 9, further comprising:
applying a force substantially along the direction to actuate a manual actuator of the electrical switching component; and
opposing at least a part of the force by the plate.

11. The method of claim 9, the method further comprising:
moving the electrical switching component in a third direction substantially orthogonal to the first direction;
aligning at least one protrusion of the electrical switching component with an opening of the mounting site in response to the movement of the electrical switching component in the third direction; and
engaging a mounting structure of the electrical switching component to the mounting site by moving the electrical switching component along the first direction.

12. A system comprising:
one or more electrical switching components, each electrical switching component including a first electrical connector and a retaining structure;
an enclosure including one or more mounting sites for engaging the one or more electrical switching components, and a panel operatively coupled and decoupled from the enclosure, the panel being arranged and configured to contact the retaining structure of each electrical switching component when the panel is coupled to the enclosure; and
one or more second electrical connectors, each second electrical connector operatively associated with one of the one or more mounting sites and arranged and configured to engage a corresponding one of the one or more the first electrical connectors when the electrical switching component is moved in a first direction while engaging the mounting site;
wherein the mounting site is configured to constrain each electrical switching component from moving in the first direction, and the panel is configured to constrain each electrical switching component from moving in a second direction opposite the first direction when the panel is contacting the retaining structure.

13. The system of claim 12 wherein the one or more electrical switching components and the mounting site are configured to constrain motion of the electrical switching components in a third direction substantially orthogonal to the first and second directions.

14. The system of claim 13 wherein each of the one or more electrical switching components includes a protrusion and each of the mounting sites includes a first opening configured to receive the protrusion and constrain motion of the corresponding electrical switching component in the third direction.

15. The system of claim 14 wherein each of the one or more electrical switching components includes a mounting structure to mount the electrical switching component to one of the mounting sites when the electrical switching component is moved in the first direction.

16. The system of claim 15 wherein the protrusion has a height that is greater than a height of the mounting structure such that the protrusion can contact the mounting site prior to the mounting structure when the electrical switching component is engaged with the mounting site.

17. The system of claim 16 wherein the protrusion can engage the first opening with an amount of misalignment between the mounting structure on the electrical switching component and a second opening on the mounting site configured to receive the mounting structure.

18. The system of claim 17 wherein, if the protrusion engages the first opening with the mounting structure misaligned with the second opening, the electrical switching device can be moved in the first direction until the mounting structure aligns with the second opening.

19. The system of claim 12 wherein the one or more electrical switching components each includes a mounting structure to mount the electrical switching components to the mounting sites when the one or more electrical switching component are moved in the first direction.

20. The system of claim 19 wherein the mounting structure comprises a mounting ear and each of the mounting sites includes an opening configured to engage the mounting ear when the one or more electrical switching components are moved in the first direction.

21. An apparatus, comprising:
an electrical switching component including an electrical switching device to control current to a load, a case substantially encapsulating the electrical switching device, a retaining structure, and a first connector disposed on a first end of the case such that the first connector can be coupled to a second connector on a mounting site by moving the case in a first direction a first protrusion extending from a side of the case opposite the retaining structure;
wherein the retaining structure of the case is configured to be constrained such that movement of the case in a second direction opposite the first direction is limited; and
wherein the case includes:
first circuitry constrained to a first voltage range and a first opening exposing the first circuitry;
second circuitry constrained to a second voltage range extending higher than the first voltage range and a second opening exposing the second circuitry; and
the retaining structure is disposed on the case between the first opening and the second opening.

22. The apparatus of claim 21, further comprising a first protrusion extending from a side of the case opposite the retaining structure, the first protrusion aligned along the first direction such that when the first protrusion is disposed in a corresponding opening, the case is constrained in a second direction substantially orthogonal to the first direction.

23. The apparatus of claim 22, the apparatus further comprising:

a second protrusion extending from the side of the case opposite the retaining structure, the second protrusion aligned along the first direction such that when the second protrusion is disposed in a corresponding opening, the case is constrained in a second direction substantially orthogonal to the first direction;

wherein:
the first protrusion is disposed on a first edge of the side of the case opposite the retaining structure;
the second protrusion is disposed on a second edge of the side of the case opposite the retaining structure; and
the first edge is opposite the second edge.

24. The apparatus of claim 23, wherein the first protrusion and the second protrusion are offset from each other along the first direction.

25. The apparatus of claim 21, wherein:
the case is an outer case;
the electrical switching device comprises:
an inner case,
a plurality of contacts disposed in the inner case, and
an opening in the inner case disposed to expose the contacts; and
the outer case is arranged to duct a blast from the opening of the inner case of the electrical switching device to a flame-resistant material to at least partially contain the blast.

26. The apparatus of claim 21, further comprising a manual actuator coupled to the electrical switching device and extending from the case, the manual actuator configured to change a state of the electrical switching device as the manual actuator is actuated in the first direction.

27. The apparatus of claim 21, wherein the retaining structure includes a protrusion extending from a surface of the case.

28. The apparatus of claim 21, wherein the retaining structure includes a recessed region within a surface of the case.

* * * * *